(12) United States Patent
Shalabi et al.

(10) Patent No.: US 7,167,874 B2
(45) Date of Patent: Jan. 23, 2007

(54) SYSTEM AND METHOD FOR COMMAND LINE ADMINISTRATION OF PROJECT SPACES USING XML OBJECTS

(75) Inventors: Sami M. Shalabi, Arlington, MA (US); Charles R. Hill, Belmont, MA (US); Joseph A. Russo, Westford, MA (US); Miguel A. Estrada, Hollis, NH (US)

(73) Assignee: International Business Machines Corporation, Armonk, NY (US)

( * ) Notice: Subject to any disclaimer, the term of this patent is extended or adjusted under 35 U.S.C. 154(b) by 815 days.

(21) Appl. No.: 10/349,424

(22) Filed: Jan. 22, 2003

(65) Prior Publication Data

US 2004/0143599 A1 Jul. 22, 2004

(51) Int. Cl.
 G06F 17/00 (2006.01)
 G06F 9/44 (2006.01)
(52) U.S. Cl. ............... 707/104.1; 717/116; 717/114
(58) Field of Classification Search ............... None
 See application file for complete search history.

(56) References Cited

U.S. PATENT DOCUMENTS

2002/0152234 A1* 10/2002 Estrada et al. ......... 707/501.1
2002/0156929 A1* 10/2002 Hekmatpour ............ 709/310
2002/0194200 A1* 12/2002 Flank et al. ............ 707/104.1

OTHER PUBLICATIONS

Dietrich et al, "A Reusable Graphical User Interface for Manipulating Onject-Oriented Databases using Java and XML", ACM 2001, pp. 362-366.*

* cited by examiner

Primary Examiner—Uyen Le
(74) Attorney, Agent, or Firm—IBM Corporation

(57) ABSTRACT

A system and method is provided for command line administration of project spaces using extensible markup language objects including a data store for storing project data, the data store including a project catalog database and a plurality of objects in project spaces; a command line element for receiving a first user command including an output command and arguments with respect to an object in the data store; a first command processor for executing the first user command against the object in the data store to generate a first extensible markup language file; a second command processor for receiving at least one subsequent user commands, each subsequent user command including an input command, and executing a first subsequent second user command against the first extensible markup language file and the data store to manage the objects in the data store and generate a resultant output extensible markup language file when needed for reentrant processing.

20 Claims, 8 Drawing Sheets

| | | |
|---|---|---|
| 252 | QP DLL (C++) | :Nqptool.exe Nquickplace.dll |
| 250 | QP JNI (C++) | Nqptool.exe Nqucikplace.dll |
| 248 | QOM | Quickplace.jar (com.lotus.quickplace.qom) |
| 246 | XML APIs | Quickplace.jar (com.lotus.quickplace.api) |
| 244 | QPTOOL (JAVA) | Quickplace.jar (com.lotus.quickplace.qptool) |
| 242 | EXE (C++) | Naptool.exe Nquickplace.dll |

SYSTEM AND METHOD FOR COMMAND LINE ADMINISTRATION OF PROJECT SPACES USING XML OBJECTS

CROSS REFERENCES TO RELATED APPLICATIONS

Ser. No. 10/334,269 filed Dec. 31, 2002 entitled "SYSTEM AND METHOD FOR THE AGGREGATION OF PLACE INFORMATION IN A MULTI-SERVER SYSTEM" (pending);

Ser. No. 10/334,261, filed Dec. 31, 2002 entitled "SYSTEM AND METHOD FOR AGGREGATING USER PROJECT INFORMATION IN A MULTI-SERVER SYSTEM" (U.S. Pat. No. 6,904,439, issued 7 Jun. 2005);

Ser. No. 10/334,296, filed Dec. 31, 2002, entitled "SYSTEM AND METHOD FOR CENTRAL REFRESH OF PLACE OBJECTS" (pending);

Ser. No. 10/334,268, filed Dec. 31, 2002, entitled "SYSTEM AND METHOD FOR SEARCHING A PLURALITY OF DATABASES DISTRIBUTED ACROSS A MULTI SERVER DOMAIN" (allowed, issue fee paid);

Serial No. 09/752,120, filed 29 Dec. 2000, entitled "METHOD AND SYSTEM FOR CREATING A THEME OF A PLACE TO BE USED AS A TEMPLATE FOR OTHER PLACES" (U.S. Pat. No. 7,028,262, issued 11 Apr. 2006);

Ser. No. 10/349,412, entitled "SYSTEM AND METHOD FOR HIERARCHICALLY INVOKING RE-ENTRANT METHODS ON XML OBJECTS" (pending);

Ser. No. 10/349,427, entitled "SYSTEM AND METHOD FOR INTEGRATING PROJECTS EVENTS WITH PERSONAL CALENDAR AND SCHEDULING CLIENTS" (pending);

Ser. No. 10/349,356, entitled "SYSTEM AND METHOD FOR INTEGRATING ONLINE MEETING MATERIALS IN A PLACE" (pending);

are assigned to the same assignee hereof and contain subject matter related, in certain respect, to the subject matter of the present application. The above identified patent applications are incorporated herein by reference.

BACKGROUND OF THE INVENTION

1. Technical Field of the Invention

This invention relates to administration of project spaces. More particularly, it relates to command line administration of places using XML objects.

2. Background Art

Similar approaches include command line piping in OS shells, but none that use object representations of XML. It allows the transfer of object as input and output in this way. It is important to note that this revolves around working with places.

IBM® Lotus® QuickPlace™ is a self-service Web tool for team collaboration. QuickPlace allows a user to publish, share, and track all information relevant to a project. Teams can then use QuickPlace to store resources (such as files, discussions, and schedules) related to a project in a common place, where everyone can access the latest information.

QPTool newsletter command is used to send daily and weekly newsletters to members of places. This command replaces the QuickPlace (QP) 2.0 quickplacenightly send newsletter feature.

In QP 2.0 administration functions were scattered amongst various tools. Some required the use a web user interface (UI), the Notes client, and a special QP administration utility. These various administration utilities did not provide for a simple batching or automatic mechanism to be built according to the administrator's policies.

The Lotus K-Station product presents QuickPlaces as projects or project spaces for a user. All pertinent project spaces on one QuickPlace server for a particular user are presented here. However, K-Station has no notion nor facility for aggregation across multiple QuickPlace servers.

The Extensible Markup Language (XML) is a W3C-endorsed standard for document markup. It defines a generic syntax used to mark up data with simple, human-readable tags and provides a standard format for computer documents which may be customized for domains such as web sites, electronic data interchange, and so forth. XML is a meta-markup language for text documents, and XML documents are trees. Data is included in XML documents as strings of text, and the data are surrounded by text markup that describes the text. A particular unit of data and markup is called an element. As a meta-markup language, XML does not have a fixed set of tags and elements, and elements may be defined as needed. (See Elliotte Rusty Harold & W. Scott Means. XML in a Nutshell. Sebastopol, Calif.: O'Reilly and Associates, 2001).

Domino, IBM, the IBM Logo, Lotus, Notes, QuickPlace and SameTime are trademarks of International Business Machines in the United States, other countries, or both.

OBJECTS AND SUMMARY OF THE INVENTION

It is an object of the invention to provide an improved system and method for administering project spaces.

A method is provided for command line administration of project spaces using extensible markup language objects by storing project data in a data store, the data store including a project catalog database and a plurality of objects in project spaces; receiving a first user command including an output command and arguments with respect to an object in the data store; executing the first user command against the object in the data store to generate a first extensible markup language file; receiving at least one subsequent user commands, each subsequent user command including an input command; and executing a first subsequent second user command against the first extensible markup language file and the data store to manage the objects in the data store and generate a resultant output extensible markup language file when needed for reentrant processing.

A system is provided for command line administration of project spaces using extensible markup language objects including a data store for storing project data, the data store including a project catalog database and a plurality of objects in project spaces; a command line element for receiving a first user command including an output command and arguments with respect to an object in the data store; a first command processor for executing the first user command against the object in the data store to generate a first extensible markup language file; a second command processor for receiving at least one subsequent user commands, each subsequent user command including an input command, and executing a first subsequent second user command against the first extensible markup language file and the data store to manage the objects in the data store and generate a resultant output extensible markup language file when needed for reentrant processing.

In accordance with an aspect of the invention, there is provided a computer program product configured to be operable for command line administration of project spaces using extensible markup language objects.

Other features and advantages of this invention will become apparent from the following detailed description of the presently preferred embodiment of the invention, taken in conjunction with the accompanying drawings.

BRIEF DESCRIPTION OF THE DRAWINGS

FIG. 3 is a diagrammatic representation of the architecture of the preferred embodiment of the invention.

DETAILED DESCRIPTION OF THE BEST MODE

In accordance with the preferred embodiments of the invention, system and method are provided for administering multiple places deployed on multiple servers. The QuickPlace command line interface (CLI), also referred to as the QPTOOL, provides server administrators with a familiar, efficient way to leverage QuickPlace administration functions. The CLI makes it possible for administrators to run QuickPlace administration utilities from the server console and from the operating system shell, and to automate common tasks and batch operations using standard tools. The implementation approach to the CLI features enables a remote server administration API. Thus, QPTool accepts XML inputs and couples to XML outputs to provide flexibility in creating administration scripts that can run automatically to carry out administration policies.

In an exemplary embodiment, using the IBM® Lotus® Domino™ console, the administrator can tell the Quick-Place server to run any command against a specified input file, with results logged to a specified output file. The administrator can run the same commands using the OS shell C\: prompt. Common tasks can be automated by the administrator writing batch processes using OS shell scripting techniques. All commands are wrappers onto an exposed QuickPlace Java API, and thus are Web serviceable. A wrapper is code implementation that protects or buffers callers from an inner code implementation and complexity, usually for ease of use, or to provide an abstraction for callers to insulate them from a particular detail of the implementation, so that the inner implementation can be altered without a caller needing to change any code.

Figure 1:
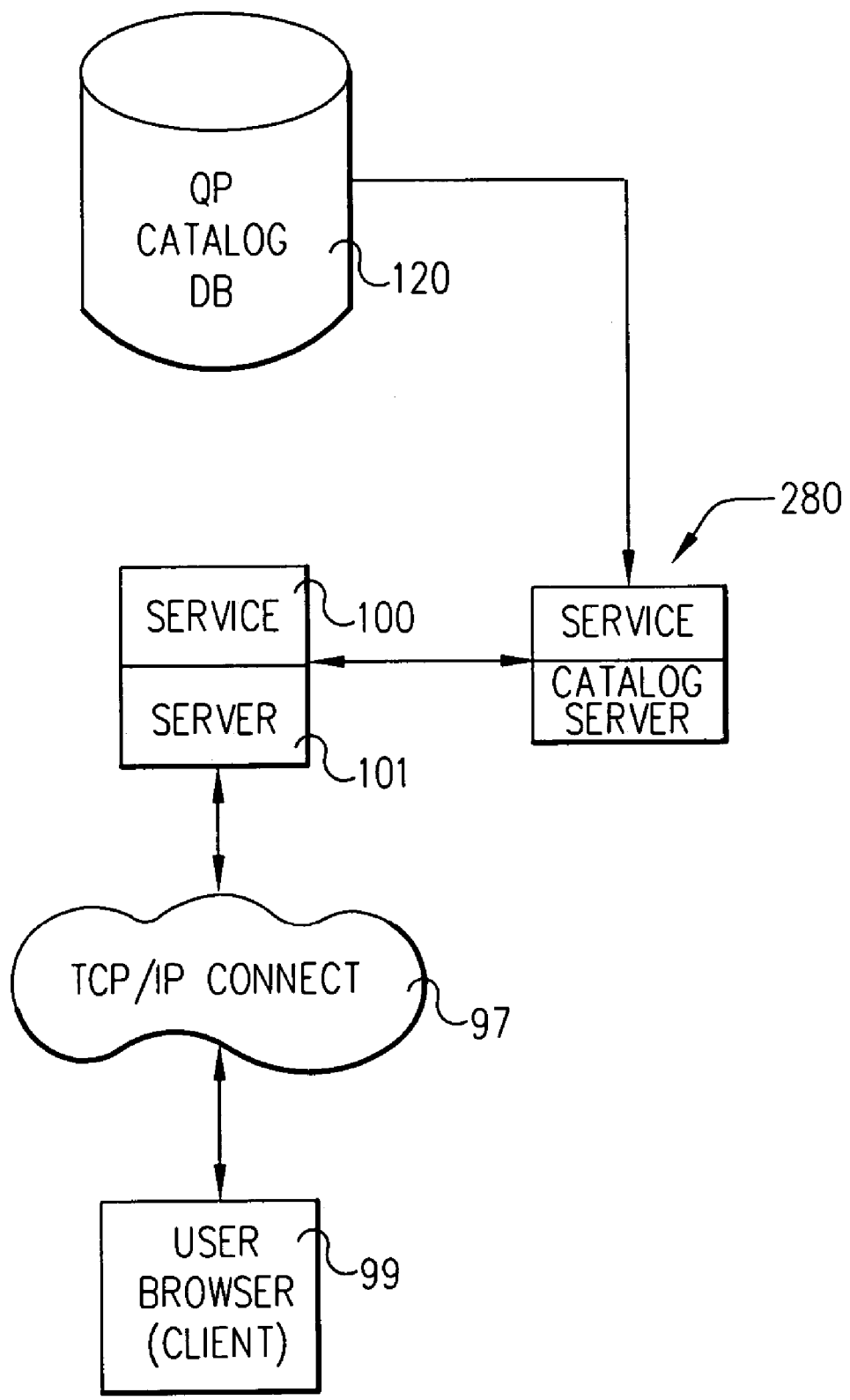
FIG. 1 is a high level system diagram illustrating a typical system configuration in accordance with the preferred embodiment of the invention.
Figure 2:
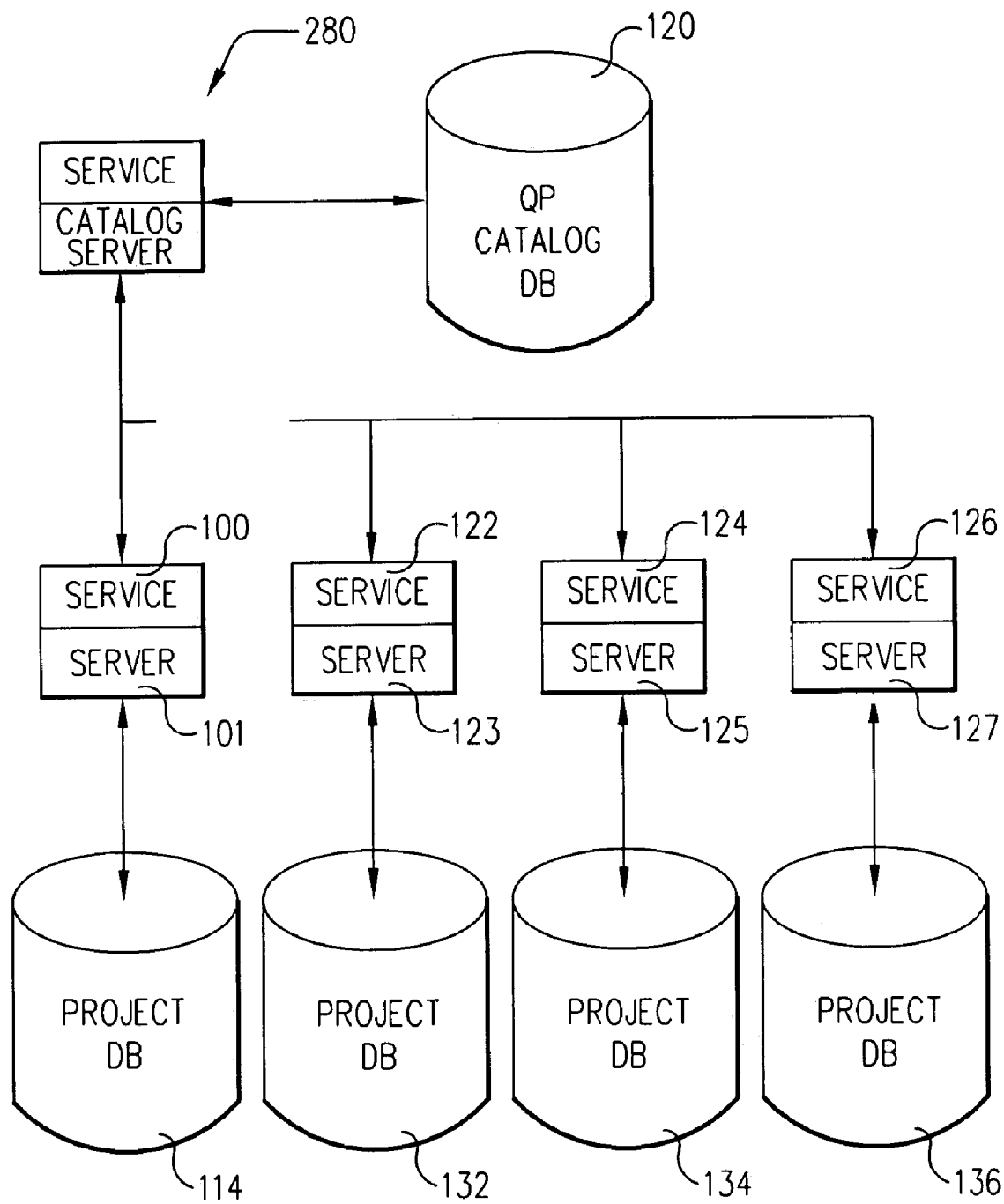
FIG. 2 is a high level system diagram illustrating a typical multi-server system environment.

Referring to FIGS. 1 and 2, catalog 120 is a database, such as an IBM® Lotus® QuickPlace® catalog, for aggregating information about projects, such as QuickPlaces 114, 132, 134, 136, in a multi-server system environment, including service 100/server 101, 122/123, 124/125, and 126/127, communications link 97, and one or more client terminals, such as user browsers 99.

Throughout this specification, the generic term "project" and more specific terms "place" or "QuickPlace" are used substantially interchangeably. Place and QuickPlace, terms used primarily connection with the IBM QuickPlace and IBM Lotus Domino products, are specific examples of projects. "Places", and as used herein "projects", are databases or other entities containing searchable data to which access is controlled, such as by access control lists in the place itself.

As illustrated in FIG. 1, a QuickPlace service 100 represents a group a servers that are able to communicate with each other through a network, and work together to provide function (such as project creation, search across projects and servers, and aggregate views across all servers and projects).

In a preferred embodiment, this service is implemented in an abstract sense, in that each server 100 implements a notion of service, which in this sense is a multi-server deployment of QuickPlace servers 101 that can be treated as a consistent unit of service for administration and in the user interface.

A QuickPlace service 100 comprises multiple QuickPlace servers 101 and/or QuickPlace clusters, which: (1) are in the same Domino domain; (2) share the same user directory and authentication system; (3) are on the same user network (i.e., are not separated by a firewall); and (4) are administered by the same administration team. These constraints are enough to ensure across the service that: (1) servers 101 can be configured consistently; (2) servers 101 can communicate and share data with each other; (3) user identities are in the same name space and do not collide; and (4) single sign on authentication can be implemented.

Referring to FIG. 3, the layered architecture of a preferred embodiment of the invention represents the QPTool functionality. It includes shell 242 which allows for running QPTool in a DOS command line, Java implementation 244 of the QPTool functionality (for functions such as archive). QPTool layer 244 calls the QP Java API 248. XML layer 246 is where QPTool functions are converted to XML objects, which can be fed into the QP Java API. QuickPlace Object Model (QOM) 248 contains the Java implementation of QuickPlace objects (such as place, or member in a place). Java native interface (JNI) serves to provide access between Java and C++ implementations. Java code in the QOM 248 calls through the JNI 250 to access core server 252 functions which in turn will return the results of the functions through the JNI layer 250 back to the Java API. Core QuickPlace server 252 is where QuickPlace server commands exist, in C++.

Figure 4:
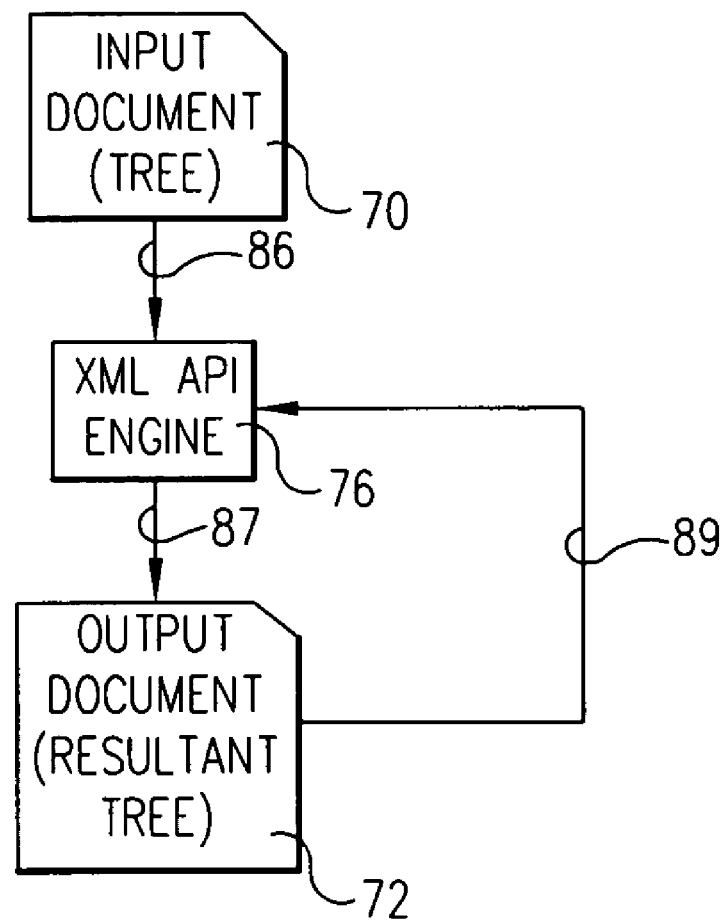
FIG. 4 is a flow chart representing generation of an output document, or resultant tree, in accordance with the preferred embodiment of the invention.

Referring to FIG. 4, XML 70 input 86 to and XML 72 output 87 from the APIs perform multiple actions in one call. Input data 86 for all APIs are the same. That is, the same object representation is used across all APIs. As is represented by line 89, input and output of an API call can be the input to another by executing reentrant path 89, and error and status indications are returned and maintained for each action by the addition of child nodes 90. Reentrant path 89 provides for processing output document 72 through engine 76 if an error is found in input 86 or if new script is generated in output 87. In the later case, engine 76 is used to generate new programs 72 out of input programs 70. The methods are extensible to add support for new actions, support for multiple servers, and support for the ability to impersonate a person. Resultant tree 72 can be reinvoked, as is represented by reentrant path 89, selectively to generate new trees with or without action and, if there were errors, to rerun. During the rerun, engine 76 will start processing in tree 72 where it left off processing of tree 70 and process only those nodes that failed, and children of those nodes.

Figure 5:
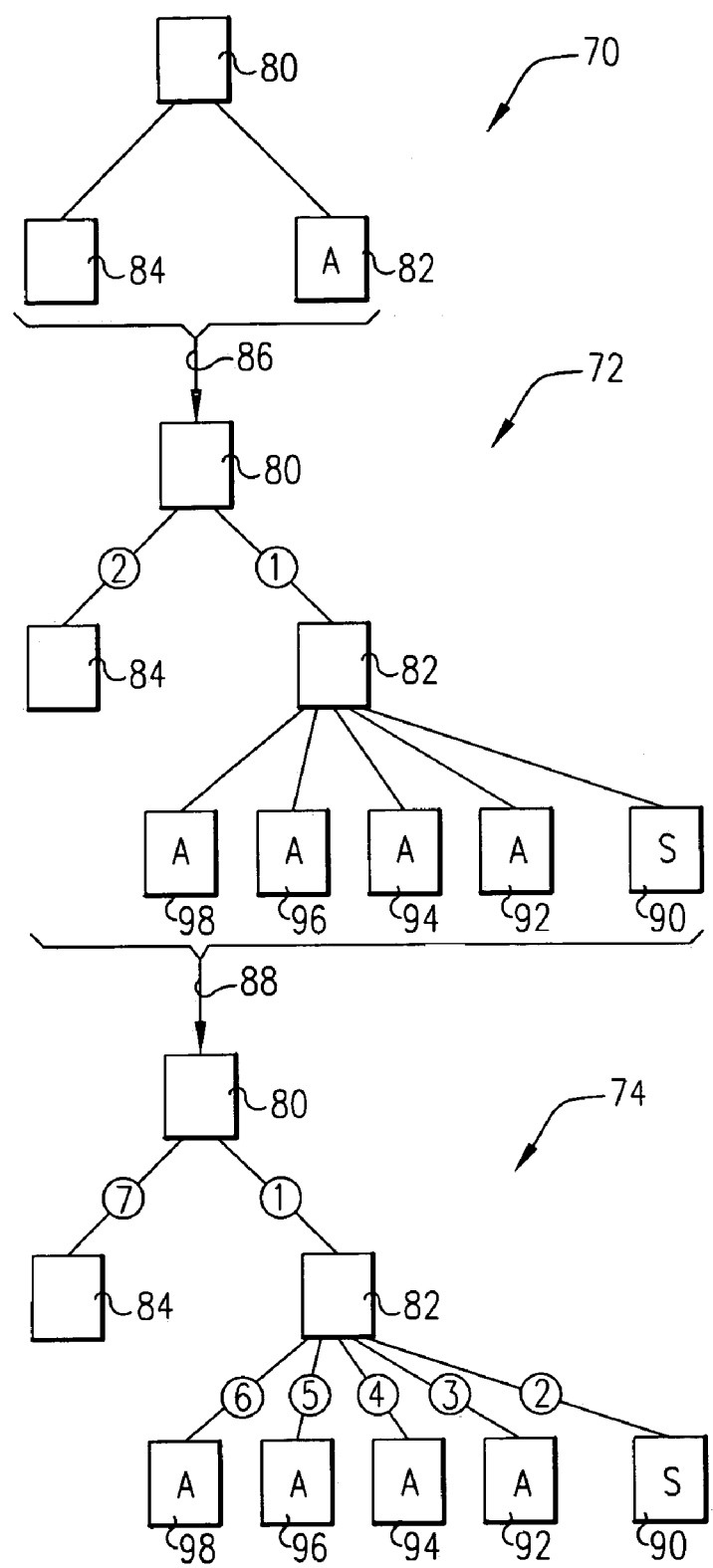
FIG. 5 is a diagrammatic representation of an output tree generated through the reentrant loop of FIG. 4.

Referring to FIG. 5 in connection with FIG. 4, an example input tree 70 includes parent node 80 and child nodes 82 and 84, node 82 representing an action node. As is represented by line 86, is this is fed to XML API engine 76 which generates an output tree 72, first visiting action node 82 which results in the addition of a sub-tree including success status node 90 and action objects 92, 94, 96, and 98. Thereafter, output tree 72 is fed back, as is represented by line 89, to XML API engine 76 and processed to create a new output document (resultant tree) 74 by processing in order objects 82, 90, 92, 94, 96, 98 and 84.

XML is created to represent, for example, a QuickPlace object. Each API capable object 82 has an action attribute associated with it. This action attribute represents the API to be invoked. The XML 70 is passed 86 into a Java method 76, which then processes the XML and returns 87 an updated form 72 of the input XML 70. Upon completion, XML 72 similar to input XML 70 is returned. Table 1 shows an example input document 70.

TABLE 1

EXAMPLE INPUT DOCUMENT (TREE 70)

```
1    <service><servers>
2        <server local = "true"
3            <places>
4                <place action = "lock">
5                    <name>haikuteam</name>
6                </place>
7            </places>
8        </server>
9    </servers></service>
```

The XML of Table 1 (input tree 70) is used to lock the place haikuteam on the local server. After the lock API is invoked (that is, node 82 is processed) the XML (resultant tree 72) of Table 2 is returned. This resultant tree 72 includes as child node 90 the action result element at lines 6–8, and new script or child node 92 at line 5. (Places element at lines 3–7 is represented by node 80, but FIG. 5 does not otherwise fully conform to the XML example of Table 2, there being no sibling nodes 84, or 92–98 in Table 2, etc.).

TABLE 2

EXAMPLE OUTPUT DOCUMENT (RESULTANT TREE 72)

```
1    <service><servers>
2        <server local = "true">
3            <places>
4                <place>
5                    <name>haikuteam</name>
6                    <action_result action = "create">
7                        <status>0</status>
8                    </action_result>
9                </place>
10           </places>
11       </server>
12   </servers></service>
```

When an action (Table 1 lines 4) is executed on a QuickPlace object, a child node 90 (Table 2 lines 6–8) is created with the action status (Table 2 lines 7) . That is, this status represents if the action was successful through the returned status code (Table 2 lines 7) in the action_result node (Table 2 lines 6–8).

In accordance with the exemplary embodiment based on a QuickPlace environment, all object representations adhere to the QuickPlace Object DTD of Table 3.

TABLE 3

DOCUMENT TYPE DEFINITION (DTD)

```
1   <?xml version="1.0" encoding="UTF-8"?>
2   <!ELEMENT service (servers?)*>
3   <!ELEMENT servers (server*)*>
4   <!ELEMENT server (name? | hostname? | port? | protocol? |
5   path_prefix? | placetypes? | places?)*>
6   <!ATTLIST server
7       id ID #IMPLIED
8       local (false | true) #IMPLIED
9       action CDATA #IMPLIED
10  >
11  <!ELEMENT placetypes (placetype*)*>
12  <!ELEMENT placetype (((name? | description? |
13  additional_information_url?)* | link))>
14  <!ATTLIST placetype
15      id ID #IMPLIED
16      action CDATA #IMPLIED
17  >
18  <!ELEMENT places (place*)*>
19  <!ELEMENT place (name? | placetype? | title? | members? | rooms?
20  | archive_directory? | lock_message? | last_accessed? |
21  last_modified? | size? | meta_data?)*>
22  <!ATTLIST place
23      id ID #IMPLIED
24      locked (false | true) #IMPLIED
25      action CDATA #IMPLIED
26  >
27  <!ELEMENT person (((dn?)* | (username? | password? | email? |
28  first_name? | last_name?)*) | description? | offline_password? |
29  theme?)*>
30  <!ATTLIST person
31      id ID #IMPLIED
32      local (false | true) #IMPLIED
33      action CDATA #IMPLIED
34      subscribed_to_newsletter (true | false) #IMPLIED
35      using_accessible_ui (false | true) #IMPLIED
36      subscribed_to_calendar_events (true | false) #IMPLIED
37      email_client (notes5 | notes6 | outlook | ical | other)
38  #IMPLIED
39  >
40  <!ELEMENT group (((dn?)* | (username?)* | username?) |
41  description?)*>
42  <!ATTLIST group
43      id ID #IMPLIED
44      local (false | true) #IMPLIED
45      action CDATA #IMPLIED
46  >
47  <!ELEMENT rooms (room*)*>
48  <!ELEMENT room (name? | access?)*>
49  <!ATTLIST room
50      id ID #IMPLIED
51      action CDATA #IMPLIED
52  >
53  <!ELEMENT access (managers? | authors? | readers?)*>
54  <!ELEMENT managers (member*)*>
55  <!ELEMENT readers (member*)*>
56  <!ELEMENT authors (member*)*>
57  <!ELEMENT members (person* | group*)*>
58  <!ELEMENT member (link?)*>
59  <!ATTLIST member
60      action CDATA #IMPLIED
61  >
62  <!ELEMENT meta_data ANY>
63  <!ATTLIST meta_data
64      action CDATA #IMPLIED
65  >
66  <!ATTLIST link
67      idref IDREF #REQUIRED
68  >
69  <!ELEMENT protocol (#PCDATA)>
```

TABLE 3-continued

DOCUMENT TYPE DEFINITION (DTD)

```
70  <!ELEMENT path_prefix (#PCDATA)>
71  <!ELEMENT port (#PCDATA)>
72  <!ELEMENT hostname (#PCDATA)>
73  <!ELEMENT name (#PCDATA)>
74  <!ELEMENT password (#PCDATA)>
75  <!ELEMENT archive_directory (#PCDATA)>
76  <!ELEMENT offline_password (#PCDATA)>
77  <!ELEMENT title (#PCDATA)>
78  <!ELEMENT theme (#PCDATA)>
79  <!ELEMENT username (#PCDATA)>
80  <!ELEMENT description (#PCDATA)>
81  <!ELEMENT additional_information_url (#PCDATA)>
82  <!ELEMENT dn (#PCDATA)>
83  <!ELEMENT email (#PCDATA)>
84  <!ELEMENT size (#PCDATA)>
85  <!ELEMENT lock_message (#PCDATA)>
86  <!ELEMENT first_name (#PCDATA)>
87  <!ELEMENT last_name (#PCDATA)>
88  <!ELEMENT last_accessed (#PCDATA)>
89  <!ELEMENT last_modified (#PCDATA)>
90  <!ELEMENT link EMPTY>
```

In the DTD of Table 3,
UTF-8 is the character set
| represents logical "OR"
? permits zero or one of the element
<! > are the comment delimiters
* permits zero or more of the element
+ permits one or more of the element
implied means optional
required means required
dn is the a distinguished name
ui is a user interface
id is an identifier which is unique in the entire file
PCDATA element may contain only parsed character data, and may not contain child elements of any type
CDATA element can contain any string of text acceptable in a well-formed XML attribute value

Object Model

Figure 6:
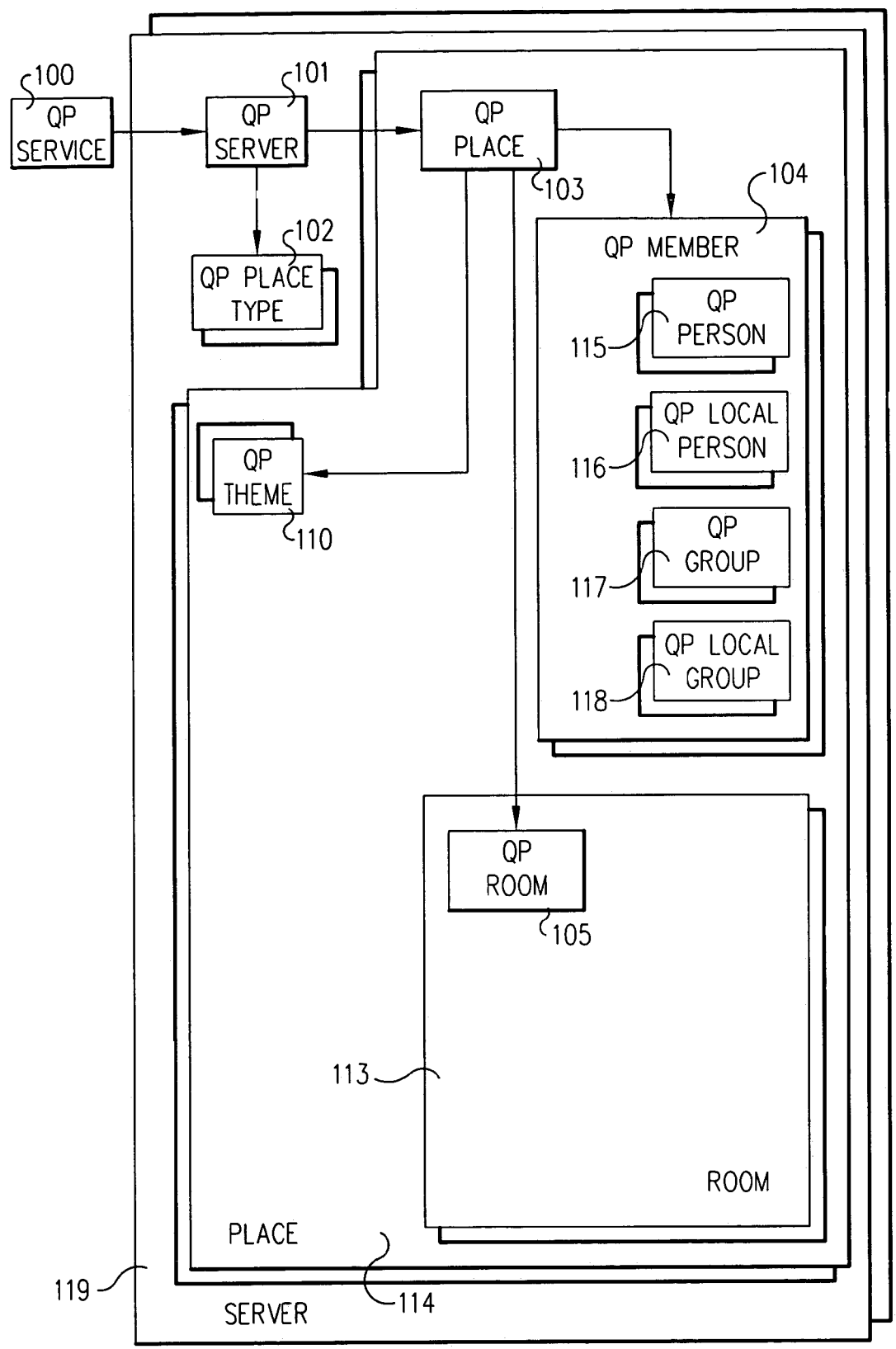
FIG. 6 is a diagrammatic representation of the object model of an exemplary embodiment of the system of the invention.

Referring to FIG. 6, a high level object model is presented of those objects relevant to the administration functionality of a preferred embodiment of the invention. Each box represents a unit that can be manipulated and used to retrieve and store data. Each object has several associated methods.

QP service 100 represents the service (Table 1 lines 1, Table 2 lines 1, Table 3 lines 2) . A service is an object that signifies a group of servers in an organization. There is one instance of a service 100 for any group of servers. Thus, a QuickPlace service is a multi-server deployment of QuickPlace servers that can be treated as a consistent unit of service for administration and in the user interface.

Server 101 represents a physical or virtual server entity or element (Table 1 lines 2, Table 3 lines 4–10) that is addressable and may contain a group of places and place types.

A QuickPlace cluster is treated as a single virtual server in the service model.

A PlaceType 102 is a mechanism for software reuse. By using it, a user may take a snapshot of a QuickPlace 114 and make a template or PlaceType for other users to create new QuickPlaces. A PlaceType allows the user (administrator, author, etc.) to control the design logic and content of a child QuickPlace 101 by refreshing it with changes made its it PlaceType.

Place 103 is an object that represents a place or project (Table 1 lines 4–6, Table 3 lines 19–26). This is the entry point into a particular project and all its data and all its manipulations—including logical methods such as lock, remove, member, and so forth.

QP members 104 (Table 3 line 57) represents members of place 114. There are many kinds of members, including person 115 (Table 3 lines 27–39), local person 116 (Table 3 lines 27–39 with attribute local=true at line 32), group 117 (Table 3 lines 40–46) and local group 118 (Table 3 lines 40–46 with local attribute=true at line 44). Members 104 are the seed of any membership operation done in place 103. Each member has an associated identity and profile (Table 3 lines 58, 60).

Room 105 (Table 3 lines 48–52) represents a room 113 (Table 3 line 47) within a project 114 (or place, Table 3 lines 19 –26).

In an exemplary embodiment, a project is a place, which is content and membership (Table 3, line 19, |members?|, and line 57) associated with that content.

A room 105 (Table 3, lines 48–52) controls access to a subset of the data in the project 114.

Each place 114 may contain many themes 110. A theme (Table 3 line 78) is an object that represents how to lay out the user interface for this project, and how to brand the user interface.

Rooms 113 (Table 3 line 47) represent multiple rooms (Table 3 lines 48–52) in a place 114 (Table 3 lines 19–26).

Places 114 (Table 3 line 18) represents multiple places (Table 3 lines 19–26) on a server 119.

Each object represents itself as xml 70 and recreates itself from the exported xml 72.

Figure 7:
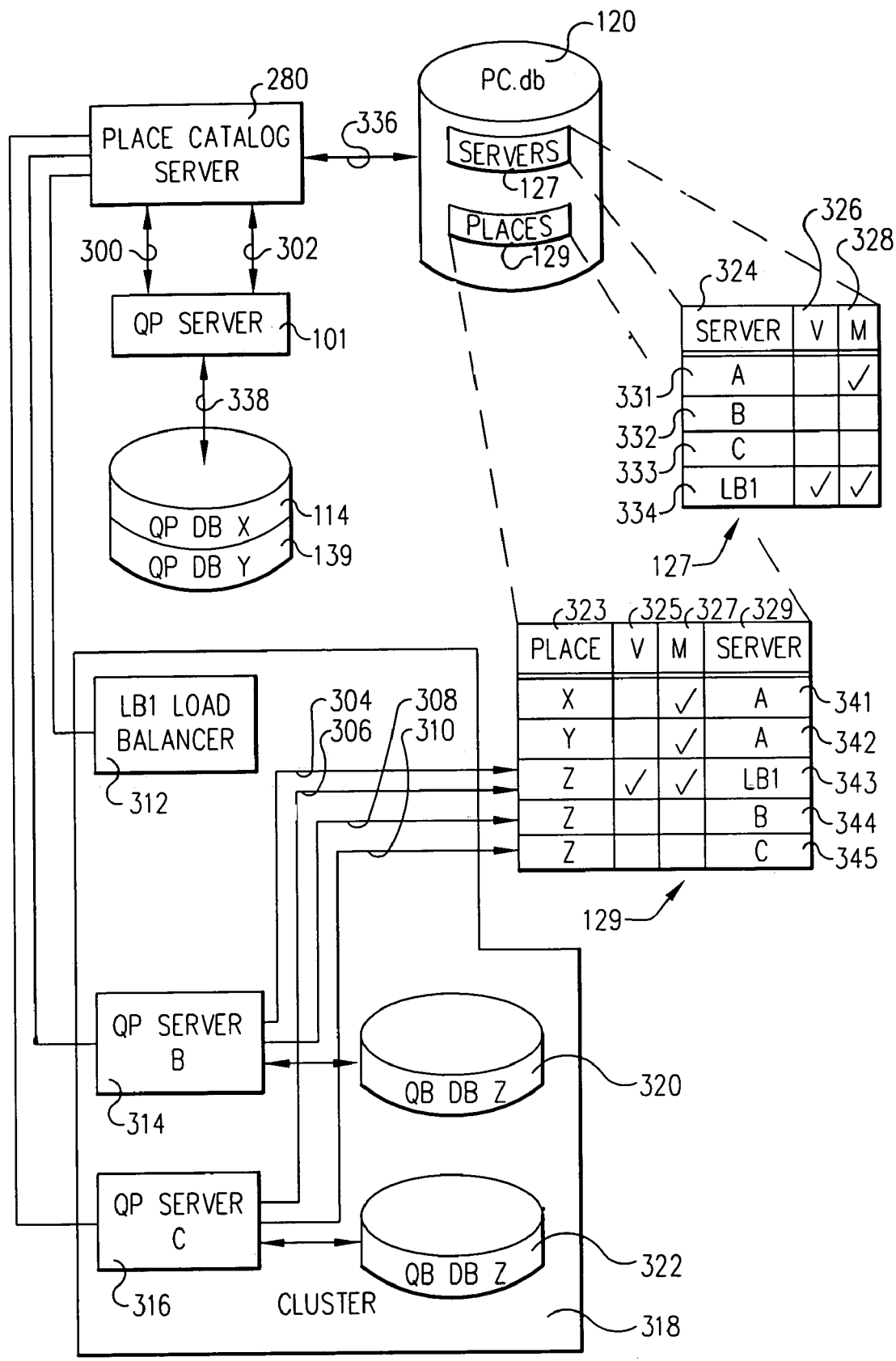
FIG. 7 is a system diagram illustrating dynamic and offline methods for aggregating information about servers and places in a multi-server environment which may include clusters.

Referring to FIG. 7, host catalog server 280 is a Domino server with QuickPlace installed which has been configured as is represented by line 336 to host catalog database 120 and which is accessible as is represented by lines 300, 302 to QuickPlace servers 101 in the enterprise through the IBM® Lotus® Notes® RPC (tcp port 1352) and http protocols. A typical project, or QuickPlace, cluster 318 includes a load balancer (LB) LB1 server 312, a plurality of other servers 314, 136, and respective project databases 312, 322. A project cluster 318 is treated as a single virtual server in the service model.

Some entries 331–334, 341–345 are created or updated in the Host catalog 120 in real time—substantially the moment an event happens. Other entries are created or updated manually by a server task, or on a scheduled basis.

As is represented by line 300, it is essential that certain data be sent in real time to avoid conflicts. For example, in a QuickPlace service 100 there cannot be two places 114, 139 with the same name. The creation of a new place 139 is an event that creates a new entry in Catalog 120 in real time. When a user creates a new place, QuickPlace server 101 first checks catalog 120 database 129 for that name 323 before creating a new entry. If it finds an existing place with that name, the user is prompted to choose a different name. If the creation of a place 139 did not immediately create an entry, it would be possible for two users to successfully create two places with the same name, which would cause a conflict when QuickPlace attempted to create entries for both in the catalog 120. To increase availability of host catalog 120, the Domino clustering feature can be used to make several host catalog servers 280 available.

Data can be updated in catalog 120 using a QPTool placecatalog-push command or on a schedule on the QuickPlace server 101.

Host catalog 120 contains information in servers view 127 about servers and in places view 129 about places. Thus, in host catalog 120, there is an entry 331 for server A 101. For simple case aggregation, or data update, projects 114, 139 are preconfigured as is represented by line 300 to point to host catalog server 280 immediately when changes occur, or as is represented by line 302 at a particular time (say, each day at 2:00 a.m.) Immediate changes may thus be made when change actions occur such as place create, place remove, place lock, change access (add/remove readers, authors, managers), and change title. Scheduled updates may be made, for example, for changes such as last modified, title, size, last accessed.

Complex aggregation is required when working with clusters 318.

Each entry in catalog 120 has a virtual indicia entry 325, 326 and master indicia entry 328, 327. A master entry, such as entry 343, is the entry through which all access to the catalog occur for a given cluster of servers 312, 314, 316. In FIG. 7, servers A 101 and LB1 312 are master servers, and columns 327 and 328 are set for corresponding entries 331, 334, and 341–343.

A virtual server is a server that does not have project (aka, place) data, but knows how to connect place users to the project servers 314, 316 which do have place data 320, 322. Server LB1 312 is a virtual server because it does not have place data in a database. Project servers A 101, B 314, and C 316 are not virtual servers because they do have place data in databases X 114, Y 139, and Z 320, 322. Databases Z 320, 322 are clustered, so they are identical; a change to one is immediately replicated to the other.

Complex aggregation for clusters is done by sending immediate updates as are represented by lines 304 and 306 to master entries 334, 343. All other updates as are represented by lines 308 and 310 to the corresponding place entry 344, 345 for the respective servers B 314, C 316. For scheduled update, host catalog server 280 executes a process to merge entries from the virtual master LB1 312 (see entry 343, which as virtual field 235 and master field 327 set) to merge entries from the virtual master entry 343 to entries 344, 345 for other servers B 314, C 316.

The Host catalog feature is enabled by the administrator creating a host catalog database 120 and a configuration file.

Host catalog 120 may be created by using a PlaceCatalog.ntf template to create a Notes database. The template is put in the Domino data directory where QuickPlace is installed. Access control on catalog 120 is granted only to all the project servers 101, etc. and to administrators of the system.

The PlaceCatalog feature is configured for each server 101, etc., that interacts with PlaceCatalog server 280 through a configuration file formatted as xml. That is, each QuickPlace server 101, etc., that wishes to operate with a PlaceCatalog 120 must have its own configuration file. The name of the file is qpconfig.xml, and is set forth in Table 4.

TABLE 4

PLACE SERVER CONFIGURATION FILE FOR CLUSTERING
(qpconfig.xml)

```
1   <?xml version="1.0" standalone="yes"?>
2   <server_settings>
3     <place_catalog_settings enabled="true">
4       <log_level>4</log_level>
5       <domino_server_name>cat1/acme</domino_server_name>
6       <nsf_filename>PlaceCatalog.nsf</nsf_filename>
7     </place_catalog_settings>
8     <cluster_settings>
9       <master virtual="true">
10        <hostname>qp.acme.com</hostname>
11      </master>
12    </cluster_settings>
13  </server_settings>
```

Cluster_settings (Table 1, lines 8–12) contains settings related to the clustering feature as it relates to the server associated with this configuration file. The PlaceCatalog understands the clustering configuration so it can make the proper decisions when registering places with the Host catalog. This cluster_settings section includes the following:

1. Master

In QuickPlace clustering there is a concept of a "master" server 312. It specifies which server in the cluster 318 acts as the "entry point" to a QuickPlace 320, 322. It can be a QuickPlace server or it can be a network dispatcher which acts as a "virtual" server. The following argument is available in this section:

virtual="yes"

virtual="no" (default)

which specifies if the master server is a device other than a QuickPlace server such as a network dispatcher or local director 312. Master includes:

2. Hostname which specifies the hostname in tcpip format of the master server 312 in a QuickPlace cluster 318 (i.e. qp.acme.com). This is the host name of a network dispatcher or local director (virtual must be "yes" above) or the hostname of a QuickPlace server (virtual must be "no" above)

Each time a place is created, it is registered in real-time with host catalog server 280. This means that PlaceCatalog 120 is configured on a QuickPlace server 101, and the host catalog server 280 must be operational for users to be able to create places.

When a QuickPlace manager adds, removes or changes a member's access level, an update is done to host catalog 120.

Host catalog 120 may be queried to retrieve a list of places 114 in which a user, or one of the groups 117, 118 of which the user is a member 104, 116, is a member 104.

When a user performs a search scoped to a number of QuickPlaces 114, 139, 320, 322 on one or more servers 101, 312, the system uses a search domain server to perform the search and it also uses the host catalog server 280 to properly construct the URLs to the places found in the search request. For this reason, the search domain server (not separately shown, but similar to server 101) is configured to recognize host catalog server 280.

Last accessed updates may be made in real time (every 1 minute) to host catalog 120.

Certain information maintained in host catalog 120 may not updated in real-time. Examples include place size and the last time it was accessed or modified. This information must be updated in batch mode. This is accomplished by running a qptool utility function "UpdatePlaceCatalog" on, for example, a daily basis. This can be automated as a Domino program entry similar to the QuickPlaceNightly tool.

When using QuickPlace clusters 318, host catalog 120 data is maintained for each node 312, 314, 316 in the cluster as well as for a virtual place representing the combination of all nodes if and only if a network dispatcher or local director has been configured and the proper settings reflect it in the qpconfig.xml configuration file (Table 4). In this case, real-time updates to the catalog are done to the virtual place entry 343 and the non-real time updates are done to each of the cluster node entries 344, 345. This allows the administrator flexibility in knowing differences in access and size for each of the nodes in the cluster.

The last accessed time updates may present a problem in large installations. For this reason, a replica of the Host catalog 120 may be created for each QuickPlace server 101.

There are two QuickPlace server cluster environment alternatives for storing QuickPlace server cluster data in Host catalog 120.

1. If cluster 318 does not have a virtual server 312, data is maintained in separate entries in host catalog 120 for each physical server 314, 316, and for each place 320, 322 on a physical server.
2. If cluster 318 has a virtual server 312, each physical server 314, 316 and place 320, 322 has an entry 344, 345, respectively. But there is also an entry 343 for the virtual server 312 that represents the combination of all physical servers. And there is an entry for each place in the cluster that represents all the replicas of the place in the cluster. When the cluster has a virtual server 312, real-time updates to host catalog 120 (such as place creation, locking of a place, and place membership changes) are made in place entries 334, 343 corresponding to the virtual server. The non-real time updates (such as place size, time last accessed, and time last modified) are made to the place entries 344, 345 corresponding to the physical servers 314, 316 in the cluster. This information allows the administrator to know the differences in access 399 and size 349 for the places 320, 322 in each of the physical servers 314, 316 in the cluster 318.

A QPTool placecatalog command with the -update flag set synchronizes the place entries 344, 345 that correspond to the physical servers 314, 316, and the place entries 343 that correspond to the virtual server 312.

To set up a virtual server 312 for a QuickPlace cluster 318, a network dispatcher is configured, such as IBM Network Dispatcher Version 3.6, with proper settings configured on each server 312, 314, 316 in the cluster 318.

Multi-Server Domain Search

Referring to FIG. 2, a search projects, or search places, facility of the present invention enables a user to search for data matching a search criteria across many projects, or places 114, 139, 136, 137 without having to access each project.

In a preferred embodiment, this search projects facility uses the Domino domain search capability. A Domino domain can include many project servers 101, 127.

User authentication is required to search places 114, etc. By use of a Domino server multi server single sign on (msso) feature, once a user has been authenticated for access to any server 101 in a domain or service 100, it has valid or authenticated access to all servers 101, 127 in that domain—which means that the user authentication is valid when accessing the domain catalog server. (The terms "domain" and "service" both refer to a plurality of project servers.)

Two interfaces provide access to the search places feature. First is through a URL. The other is through an API. URL access is used in a QuickPlace search places user interface (UI) when search places is enabled on a user's QP server 280.

A search project url request includes search criteria, information about, and the ID of, the user requesting the information, and when executed will generate a search result. When the search places facility is used from each place 114, it redirects the search places UI provided by a special place on Domain Catalog server 280, which UI collects search criteria information from a user. Search requests collected at the search places UI is handled by the domain catalog server 280 (rather than the place server 101).

Figure 8:
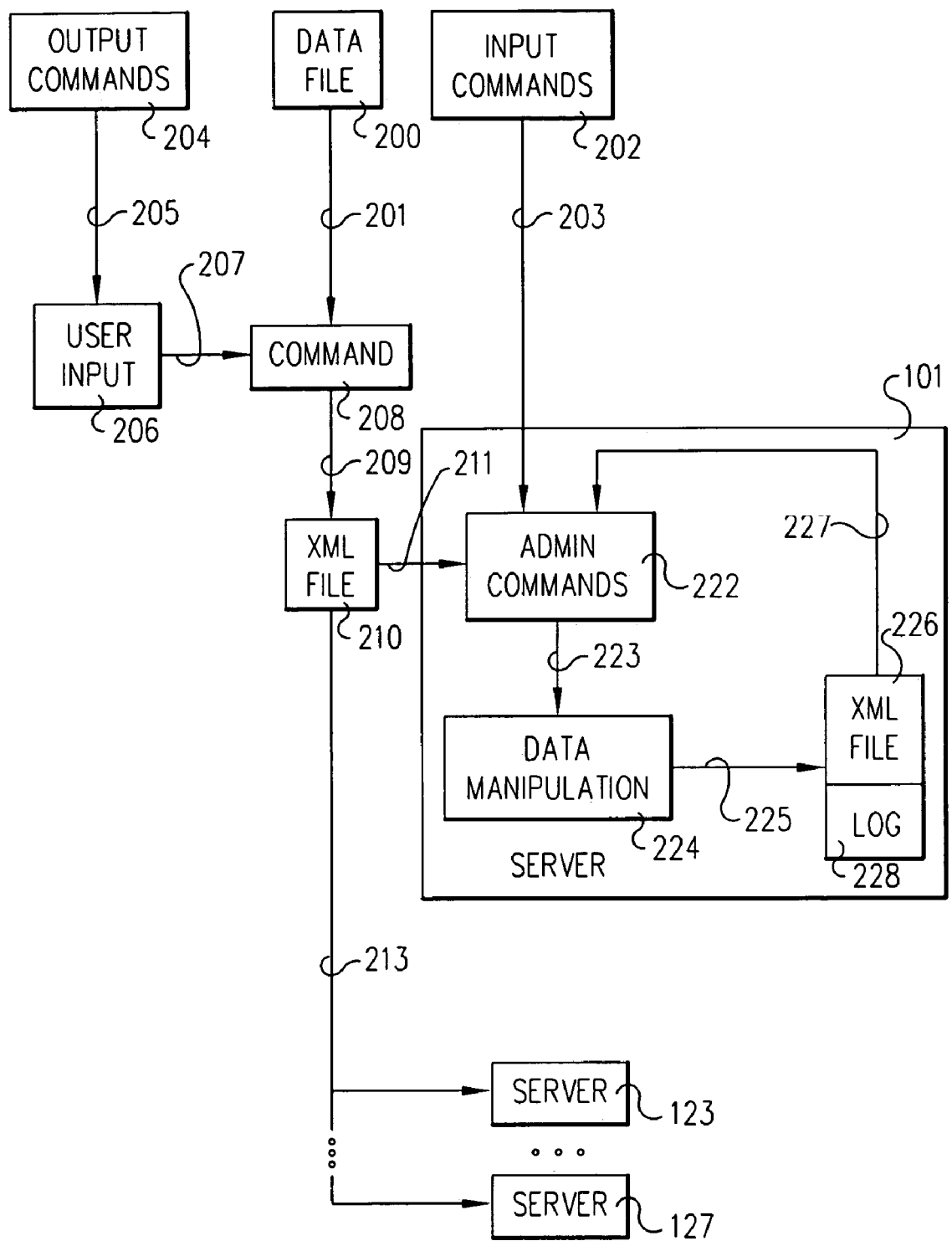
FIG. 8 is a schematic representation of the system of the preferred embodiment of the invention for administering an infrastructure of places through the command line.

Referring to FIG. 8, a system and method is provided for administering an entire infrastructure of places through the command line.

There are two types of command lines: input commands 202 and output commands 204. Output commands 204 include report. Input commands 202 include lock, unlock, archive, remove, and sendmail. These and other input and output commands are described in more detail hereafter.

Data file 200 stores place data, and includes a place catalog. As is represented by lines 205 and 207, output command 204 is processed through user input 206 to define command 208. As is represented by lines 201 and 209, command processor 208 operates on data file 200 to generate an XML file 210. As is represented by lines 211 and 213, XML file 210 is fed to any of a plurality of servers 101, 123, 127 in a service. As is represented by line 203, input commands are also fed to servers 101, etc. in the service. As is represented by lines 223, 225, and 227, administration commands 222 perform data manipulation 224 to generate an XML file 226 and log 228. XML files 210 and 226 conform to the format set forth in Table 3.

Referring further to FIG. 8, in operation, a user administrator selects output command 204 of report and inputs 206 search criteria, such as "places not accessed for six months". The report command and search criteria are executed by command processor 208 against data file 200 to generate in XML file 210 a list of places satisfying the search criteria. The Administrator then issues a series of input commands 202, such as archive, followed by remove, followed by sendmail, the first of which is executed against XML file 211 to generate a first output XML file 226 which is fed back to command processor 222 for execution of subsequent input commands. This process may repeated at each administrator selected server 101, 123, 127 in the service. As a result, by way of example, places not accessed for six months are first archived, then removed from data file 200, and mail is sent to persons identified to the place informing them that the place has been archived.

QuickPlace server administrators can run the command line tool qptool from the server console, the program directory, or from a batch file or other program.

Administrators use the administration utilities in the QPTool application to complete a variety of tasks, including locking and unlocking places, changing user names, registering and unregistering places, generating reports, as will be more fully described hereafter.

The reports that are generated by qptool can be input for other qptool commands. For example, the administrator can generate a report of all the places over 100 Mh, and then feed that report to any command, e.g. archive. This tool will know which places to run archive on and create a log for the places on that server. This same report can be run on all the servers and the relevant subset of places will only get the command run on.

The qptool model is:

1. Command line object aware because it uses XML representations of QuickPlace (Table 3).
2. Objects are used to determine what to run on and what server to use.
3. Output of one command may be the input to another.
4. API able.

QPTool 244 produces XML output. QP Java API 246 can accept XML inputs. The above "API able" statement means that the XML produced by QPTool can in turn be passed to the Java API 246 as is.

The following scenario is an example of how administrators automate administration tasks:
1. Each place is automatically cross charged $100/month while it is active.
2. Each place is automatically archived and deleted if it is unused for 60 days.

To implement cross-charging, when a place is created, the creator is required to specify a cost center number, and the creator's name and the cost center are stored in custom fields in place catalog 120. A list of usage records is sent to a financial relational database (RDB) on a monthly schedule. Each usage record includes the name of the place to be charged for, the cost center, and the name of the creator of the place. If a place is not used in a given month, no usage record is submitted.

To implement expiration, the last-accessed date of each place is evaluated once per month, and expired places are archived then deleted from the host servers.

In this example, a QuickPlace system 101 is operated to run as follows, on a monthly schedule:
1. Using "qptool report", generate an XML report 210 of all places currently deployed across all servers 101, 123, 127. The report includes for each place 114 all the standard catalog data, including last accessed date, and the custom creator and cost center fields.
2. Using a custom Extensible Stylesheet Language (XSL) file, transform the report into a list of usage records as required, in comma-delimited format. The XSL also filters out inactive places.
3. Send the usage records to the relational database (RDB).
4. Using another custom XSL file, transform the report into an XML "place list" specifying places that are due to be expired. This XSL selects only places that have been inactive for 60 days.
5. Using "qptool archive", archive all the expired places to secondary storage, server by server.
6. Using "qptool remove", remove all the expired places from their original servers, server by server.
7. Using "qptool sendmail", send email to the managers of all the expired places.

To implement the automated solution example described above, a number of mechanisms outside of place server 101 are required, including:
1. A main program. This is written either as a command line utility (e.g., Cshell script), a Domino Java agent, or as a Java application.
2. A job control mechanism that automates running of the system on the monthly schedule. E.g., an OS command such as "chron" on Unix, "at" on NT.
3. A remote API mechanism that enables the job control system to communicate with place catalog server 280 to generate the XML report, and to communicate with the individual QuickPlace application servers 101, 312.

A variety of mechanisms are possible. For example, if the main program is a command line utility, either:
1. remote login ("rsh" in Unix) and synchronize/share data via a shared volume.
2. Schedule a copy of the main program on every destination server and synchronize/share data via a shared volume.
3. Ad hoc remote method invocation using custom servlets over HTTP(S).
4. SOAP over HTTP(S).
5. An XSLT transform mechanism applies XSL to the XML report, and generates the transformed result. If the main program is a command line utility, the best option will be a standard command line XSLT utility as is provided by Apache/WebSphere. If the main program is a Java application, the applicable J2EE classes can be used directly.
6. A remote API mechanism enables the job control system to send the usage records to the RDB, whatever is usually used in the deployment environment—e.g., JDBC or ODBC QPTool Command Line Tool QuickPlace server administrators can run a command line tool called QPTool from a server 101 console, the program directory, or from a batch file or other program. Administrators use the administration utilities in the QPTool application to complete a variety of tasks, including locking and unlocking places, changing user names, registering and unregistering places, generating reports.

Using QPTool Commands

QPTool is a server task that is run with arguments to do administrative tasks. The QPTool command is used to complete the following tasks:
1. Change user and group names in places
2. Change the hierarchy of names in places
3. Reset user passwords
4. Remove members from places
5. Send newsletters to subscribers
6. Send mail to managers and members of places
7. Register and unregister places
8. Automate replica stub creation
9. Upgrade places and PlaceTypes
10. Refresh places and PlaceTypes
11. Lock and unlock places
12. Archive places
13. Remove places or PlaceTypes
14. Update statistics in the Place Catalog
15. Generate reports about places and servers
16. Repair places
17. Clean up dead mail
18. Execute an XML API file Running QPTool QPTool commands are designed to be used while the QuickPlace server is running. To run QPTool from a server console, the user enters:
    load qptool [command] [arguments]

To run QPTool from the Domino program directory on the Windows NT platform, the user enters:
    nqptool [command] [arguments]

To run QPTool from the Domino program directory on a UNIX platform, the user enters:
    qptool [command] [arguments]

QPTool can also be run from a batch file or other program.
Place catalog 120 reflects changes that result from QPTool commands.

QuickPlace server administrators running QuickPlace for iSeries™ systems can also run QPTool commands from the OS/400@ command interface. The OS/400 command interface syntax is different from the Domino server console syntax.

When a QPTool command is run on a server in a cluster 318, QuickPlace applies the command immediately only to the server on which the command is run. The command is applied to other servers in the cluster after cluster replication next occurs to those servers. For example, if a place 320 on one server 314 in a cluster 318 is locked, the place 320 is locked immediately only on that server 314. After cluster replication replicates the place to other servers 316 in the cluster however, the place 322 is also locked on those servers.

The QPTool report command can gather information from all servers in a cluster. However, if the results of the report command are supplied as input to another qptool command, the other qptool command only acts immediately on the server from which the command is issued.

Changing User and Group Names

The QPTool changemember command is used to change the name of a local user 116, external user 115, or external group 117 in specified places. The original name is the source name and the name changed to is the target name.

Using changemember, the following administrative tasks may be done:
1. Change a user (Table 3 line 27) or group name (Table 3 line 40) to a new name—for example, change the name of a user who recently married so the user can continue to access a place using the new name. In this case, the target name is a new name.
2. Change the name of a user or group to the name of another existing user or group—for example, change the name of a user who leaves the company to the name of a remaining user who assumes the original user's responsibilities. The access (Table 3 line 53) the target name has to places is the higher level of access between the source and target names. For example, if the source name is a manager of a place and the target name is a reader of the place, the target name becomes a manager of the place and has access to all pages previously accessible to the source and target names. The same access control principle applies to room access.
3. Change the name of a local user to the name of an external user in a user directory—for example, to move from a pilot deployment that uses local users to a production deployment that uses a corporate directory. The following combinations of name changes may be made:
   1) Local user name to local user name
   2) Local user name to external user name
   3) External user name to external user name
   4) External group name to external group name The following combinations of name changes may not be made:
   1) External user name to local user name
   2) External group name to local user name
   3) External group name to external user name
   4) Local user name to external group name
   5) External user name to external group name The syntax for the changemember command is:

qptool changemember arguments

Table 4A defines the arguments which may be used. When a name specified as an argument contains spaces, quotation marks are included (" ") around the name. dn means defined name.

TABLE 4A

QPTOOL CHANGEMEMBER ARGUMENTS

| | | |
|---|---|---|
| 1 | -o outputfilename | XML output file that logs the results of |
| 2 | | the command. By default the command |
| 3 | | logs results to QPTOOL.CHANGEMEMBER. |
| 4 | | XML in the server program directory. |
| 5 | -i inputfilename | XML input file that specifies the places |
| 6 | | in which to rename the user or group. |
| 7 | -p place(s) | Specifies a place or a space-separated |
| 8 | | list of places in which to rename the |
| 9 | | user or group. |
| 10 | -targetg | Indicates that the specified target name |
| 11 | | is that of an external group. |
| 12 | -targetu name | Specifies the new name of a local user, |
| 13 | | for example, " Joe Smith." |
| 14 | -targetdn name | Specifies the new distinguished name of |
| 15 | | an external user or external group |
| 16 | | exactly as it appears in the external |
| 17 | | directory (including spaces) — for |
| 18 | | example, "cn=Representatives, |
| 19 | | ou=Sales,o=Acme." |
| 20 | -sourceg | Indicates that the specified source name |
| 21 | | is that of an external group. |
| 22 | -sourceu name | Specifies the original name of a local |
| 23 | | user, for example, " Joe Smith." |
| 24 | -sourcedn name | Specifies the original distinguished |
| 25 | | name of an external user or external |
| 26 | | group exactly as the name appears in the |
| 27 | | external directory (including spaces), |
| 28 | | for example, " cn=Connor Jones, |
| 29 | | ou=Sales,o=Acme." |
| 30 | -? | Prints help on the command. |

Following are several examples of using the qptool changemember command.
1. The command to change the name of local user name to an external user name:
   >load qptool changemember -p PlaceName -sourceu localuser—targetdn "CN=ExternalUser, O=[Organization]"
2. The command to change an external user name to an external user name:
   >load qptool changemember -p PlaceName -sourcedn "CN=External User,O=[Organization]" -targetdn "CN=New External User,O=[Organization]"
3. The command to change an external group name in multiple places:
   >load qptool changemember -p PlaceName1 PlaceName2 -sourceg "CN=External Group,O=[Organization]" -targetdn -targetg "CN=New External Group,O=[Organization]"

Changing the Name Hierarchy of Names in Places

The QPTool changehierarchy command is used to change the hierarchy in the names of external users 115 and groups 117 in places 114. For example, if the company name changes and the names of users and groups in an external directory are changed to reflect the change, the changehierarchy command is used to change the names in places. Or if a new group is created with a new hierarchy in an external directory to encompass what was previously two groups, the names of the original groups are changed in places to the name of the new group., The changehierarchy command does not operate on local users 116, 118. The syntax for the changehierarchy command is:

load qptool changehierarchy arguments

Table 5 describes the arguments that can be used with the command.

TABLE 5

LOAD QPTOOL CHANGEHIERARCHY ARGUMENTS

| | | |
|---|---|---|
| 1 | -? | Prints help on the command. |
| 2 | -o outputfilename | XML output file that logs the results of |
| 3 | | the command. By default the command |
| 4 | | logs results to |
| 5 | | QPTOOL.CHANGEHIERARCHY.XML |
| 6 | | in the server program directory. |
| 7 | -i inputfilename | Changes the names of external users and |
| 8 | | groups that use the original name |
| 9 | | hierarchy to the new name hierarchy in |
| 10 | | places specified in an XML input file. |
| 11 | -p place(s) | Changes the names of external users and |
| 12 | | groups that use the original name |
| 13 | | hierarchy to the new name hierarchy in a |
| 14 | | place or a space-separated list of |
| 15 | | places. |
| 16 | -a | Changes the names of external users and |
| 17 | | groups that use the original name |
| 18 | | hierarchy to the new name hierarchy in |
| 19 | | all places. |
| 20 | -targeth hierarchy | Specifies the new name hierarchy, for |
| 21 | | example, ou=people2,o=group. The name |
| 22 | | hierarchy specified should correspond to |
| 23 | | a valid name hierarchy in the external |
| 24 | | directory. |
| 25 | -sourceh hierarchy | Specifies the original name hierarchy to |
| 26 | | change, for example, ou=people,o=group. |

Following are two examples of using the changehierarchy command.

1. The command to change the names of users and groups within the hierarchy ou=boston,o=acme to the hierarchy ou=detroit,o=acme in the place P1:

>load qptool changehierarchy -sourceh ou=boston, o=acme -targeth ou=detroit,o=acme -p P1

2. The command to change the names of users and groups with the hierarchy ou=boston,o=acme to the hierarchy ou=detroit,o=acme in all places >load qptool changehierarchy -sourceh ou=boston, o=acme -targeth ou=detroit,o=acme -a Resetting User Passwords The QPTool password command is used to reset passwords (Table 3 lines 74, 76) for a local user 104. To change the password for an external user, the entry for the user is changed-in the external directory. The syntax for the password command is:

load qptool password arguments

Table 6 describes the arguments for the command.

TABLE 6

LOAD QPTOOL PASSWORD ARGUMENTS

| | | |
|---|---|---|
| 1 | -o outputfilename | XML output file that logs the results of |
| 2 | | the command. By default the command |
| 3 | | logs results to QPTOOL.PASSWORD.XML in |
| 4 | | the server program directory. |
| 5 | -i inputfilename | XML input file that specifies places on |
| 6 | | which to change the user's password. |
| 7 | -p place(s) | Specifies a place or a space-separated |
| 8 | | list of places on which to change the |
| 9 | | user's password. |
| 10 | -pw password | Specifies the new password. |
| 11 | -u name | Specifies of the name of the local user |
| 12 | | whose password are being changed. |
| 13 | -? | Prints help on the command. |

Following are examples of using the password command.

1. The command to change the password for a local user whose name includes spaces:

>load qptool password -p placename -u "joe user"-pw newpassword

2. The command to change the password for a local user whose name has no spaces:

>load qptool password -p placename -u joeuser -pw newpassword

Removing Members from Places

The QPTool removemember command is used to remove members 104 (Table 3 lines 58–61) from a place. The syntax for the removemember command is:

load Qptool removemember arguments

Table 7 describes the arguments to be used with the command.

TABLE 7

LOAD QPTOOL REMOVEMEMBER ARGUMENTS

| | | |
|---|---|---|
| 1 | -o outputfilename | XML output file that logs the results of |
| 2 | | the command. By default the command logs |
| 3 | | results to QPTOOL.REMOVEMEMBER.XML in |
| 4 | | the server program directory. |
| 5 | -i inputfilename | XML input file that specifies the places |
| 6 | | from which to remove the specified name. |
| 7 | -p place(s) | Removes the specified name from a place or a |
| 8 | | space-separated list of places. |
| 9 | -a | Removes the specified name from all places. |
| 10 | -u name | Name of a local user to remove. If the name |
| 11 | | contains a space, include quotation marks |
| 12 | | around it, for example: " Jonathan Carter" |
| 13 | -g | Indicates that a specified distinguished name |
| 14 | | is that of a group |
| 15 | -dn name | Name of an external user or group to remove. |
| 16 | | If the name contains a space, include |
| 17 | | quotation marks around it. Specify the name |
| 18 | | exactly as it is defined in the external |
| 19 | | directory, for example: |
| 20 | | " cn=connor jones, ou=sales,o=acme" |
| 21 | -? | Prints help on the command. |

Following are examples of using the removemember command.

1. To remove the external user cn=connor jones,ou=sales, o=acme from the place P1 and log the command output to the non-default XML output file QPTOOL.MYOUTFILE.XML:

>load qptool removemember -dn "cn=connor jones, ou=sales,o=acme" -p P1 -o QPTOOL.MYOUTFILE.XML 2. To remove the external group cn=managers, ou=groups, o=acme from places specified in the XML input file QPTOOL.MYREMMEM.XML:

>load qptool removemember -i qptool.myremmem.xml -g -dn "cn=managers,ou-groups,o-acme"

3. To remove the external user cn=connor jones,ou=sales, o=acme from all places:

>load qptool removemember -dn "cn=connor jones, ou=sales,o=acme" -a

4. To remove the local user Jonathan Carter from the places P1 and P2

>load qptool removemember -u "Jonathan Carter" -p P1 P2

5. To remove the external group cn=managers,ou=groups, o=acme from the place P1

>load qptool removemember -g -dn "cn=managers, ou=groups,o=acme" -p P1

6. To remove the external user cn=connor jones,ou=sales, o=acme from the place P1
   >load qptool removemember -dn "cn=connor jones, ou=sales,o=acme" -p P1

Sending Newsletters to Subscribers

The QPTool newsletter command is used to send daily and weekly newsletters to members 104 of places 114. Members of a place can receive daily newsletters if daily newsletters are enabled for the place, and can receive weekly newsletters if weekly newsletters are enabled. To receive a newsletter, a member subscribes to newsletters in a member information page 104 and must have a valid e-mail address. The syntax for the newsletter command is:

qptool newsletter arguments

Table 8 describes the arguments.

TABLE 8

QPTOOL NEWSLETTER ARGUMENTS

| | | |
|---|---|---|
| 1 | -o outputfile | Logs results to a specified XML output file. |
| 2 | | By default logs results to |
| 3 | | QPTOOL.NEWSLETTER.XML in the program |
| 4 | | directory. |
| 5 | -i inputfile | Sends newsletters for places specified in an |
| 6 | | XML input file. |
| 7 | -p place(s) | Sends newsletters for a place or a space- |
| 8 | | separated list of places. |
| 9 | -a | Sends newsletters for all places. |
| 10 | -weekly | Sends newsletters in weekly format. Weekly |
| 11 | | newsletters are not sent by default. Using a |
| 12 | | Program document to schedule the mailing of |
| 13 | | weekly newsletters for all places is |
| 14 | | recommended. For example, weekly newsletters |
| 15 | | may be mailed Mondays at 2 AM. In QuickPlace |
| 16 | | 3.0, administrators have complete control |
| 17 | | over when weekly newsletters are mailed. |
| 18 | -daily | Sends newsletters in daily format. By default |
| 19 | | the NOTES.INI file includes the setting |
| 20 | | ServerTasksAt1 = qptool newsletter -daily -a so |
| 21 | | that daily newsletters are sent at 1 AM for |
| 22 | | all places. The time when daily newsletters |
| 23 | | are sent can be changed by modifying the |
| 24 | | NOTES.INI file or scheduling the command |
| 25 | | through a Program document. |
| 26 | -? | Prints help on the command. |

Sending Mail to Managers and Members of Places

A QPTool sendmail command is used to broadcast an e-mail message to all managers or all members 104 of a place 114. The Send Mail command is useful for communicating administration issues to place managers. For example, a broadcast e-mail may be sent to the managers of places if the places have exceeded a predetermined size limit and will be archived. The syntax for the sendmail command is:

load qptool sendmail arguments

Table 9 describes the arguments available for the command.

TABLE 9

LOAD QPTOOL SENDMAIL ARGUMENTS

| | | |
|---|---|---|
| 1 | -o outputfile | Logs results to a specified XML output |
| 2 | | file. By default logs results to |
| 3 | | QPTOOL.SENDMAIL.XML in the program |
| 4 | | directory. |
| 5 | -i inputfile | A required argument that specifies the |

TABLE 9-continued

LOAD QPTOOL SENDMAIL ARGUMENTS

| | | |
|---|---|---|
| 6 | | places and other data in an XML input |
| 7 | | file. If tags for title, size, |
| 8 | | last_accessed or last_modified are used, |
| 9 | | values for those fields must exist in |
| 10 | | the input file. The qptool sendmail |
| 11 | | command only looks to the input file for |
| 12 | | its data; it does not query the places |
| 13 | | for the tag values. |
| 14 | -managers | Sends mail to managers only. Without |
| 15 | | this argument, sends mail to all |
| 16 | | members, including the managers. |
| 17 | -template template | XSL template file that specifies the |
| 18 | | message. |
| 19 | -? | Prints help on the command. |

Table 10 is a sample template file for use with the sendmail command.

TABLE 10

SAMPLE TEMPLATE FILE FOR SENDMAIL COMMAND

| | |
|---|---|
| 1 | <?xml version=" 1.0" ?> |
| 2 | <xsl:stylesheet |
| 3 |     xmlns:xsl=" http://www.w3.org/1999/XSL/Transform" |
| 4 |     version=" 1.0" |
| 5 |     xmlns:lsxlt=" http://xml.apache.org/xslt" |
| 6 |     xmlns:java=" http://xml.apache.org/xslt/java" |
| 7 | > |
| 8 | <xsl:template match=" place" > |
| 9 | <mail> |
| 10 | <from>E-mail address here</from> |
| 11 | <cc>List of e-mail addresses here</cc> |
| 12 | <bcc>List of e-mail addresses here</bcc> |
| 13 | <subject>Subject string here</subject> |
| 14 | <body> |
| 15 | This mail is sent to members of place '<xsl:value-of |
| 16 | select=" ./name" />' by qptool sendmail using xsl as a mail |
| 17 | template. Some other fields which might be used are: |
| 18 | TITLE: '<xsl:value-of select=" ./title" />', |
| 19 | SIZE: '<xsl:value-of select=" ./size" />', |
| 20 | LAST_ACCESSED: '<xsl:value-of select=" ./last_accessed" />', |
| 21 | LAST_MODIFIED: '<xsl:value-of select=" ./last_modified" />' |
| 22 | </body> |
| 23 | </mail> |
| 24 | </xsl:template> |
| 25 | </xsl:stylesheet> |
| 26 | Information about each place can be included in the e-mail |
| 27 | to managers or members of that place. The tags used in the |
| 28 | template look like: |
| 29 | '<xsl:value-of select=" ./fieldname" />' |
| 30 | where fieldname is the name of a field in the input XML. |

Registering and Unregistering Places on the Server

The QPTool register command is used to do the following:

1. Add place documents in place catalog 120 for places 114 created prior to enabling the place catalog or for places added from another server. Places require place documents for QuickPlace service 100 to be aware of them.
2. Adjust server-specific information for a place 114 that has been moved from another server 123 or renamed on the same server 101 (FIG. 2).
3. Restore a place that was previously archived.
4. Register a server in place catalog 120.

The QPTool unregister command is used to remove a place's document from place catalog 120. For example, if place catalog 120 is down for any period of time, all places 114 are unregistered and then the register command is used to register the places again so that place catalog 120 contains up-to-date place information. When the remove command is used to remove a place 114, the unregister command does not have to be used because the remove command automatically removes the place document.

The syntax for the register/unregister command is:

qptool register[unregister] arguments

Table 11 describes the arguments.

TABLE 11

| QPTOOL REGISTER[UNREGISTER] ARGUMENTS | | |
|---|---|---|
| -o outputfilename | XML output file that logs the results of the command. By default the command logs results to QPTOOL.REGISTER.XML or QPTOOL.UNREGISTER.XML in the server program directory. |
| -i inputfilename | XML input file that specifies the places to register/unregister. |
| -p place(s) | Specifies a place or a space-separated list of places to register/unregister. |
| -a | Registers/unregisters all places. |
| -install | Installs and resets server-specific information for places that have been: Moved to this server from another server Renamed on this server Restored from archive |
| -server | Registers/unregisters the server on which the command is run in the Place Catalog. The first time a place is created on a server, the server is registered in the Place Catalog automatically if the Place Catalog is set up. |
| -placecatalog | Registers/unregisters specified place(s) or server in the Place Catalog. |
| -? | Prints help on the command. |

If port or protocol settings for the server are changed, "qptool unregister -server" is first run, and then "qptool register -server" to reset the information in place catalog 120.

Following are several examples of using the qptool register/unregister command.

1. To unregister a place and log results in a non-default output file:
   >load qptool unregister -p placename -o qptool.myout.xml
2. Register a place and log results in a non-default output file:
   >load qptool register -p placename -o qptool.myout.xml
3. To unregister places specified in an input file:
   >load qptool unregister -i qptool.myinput.xml
4. To register places specified in an input file:
   >load qptool register -i qptool.myinput.xml
5. To unregister all places on the server (that is, remove from place catalog):
   >load qptool unregister -a
6. To register all places on the server in the Place Catalog after upgrading to 3.0 and enabling the Place Catalog:
   >load qptool register -a -placecatalog
7. To unregister multiple places:
   >load qptool unregister -p place1 place2 place3
8. To register multiple places that have been moved from another server:
   >load qptool register -p place1 place2 place3 -install
9. To register a place in the Place Catalog only:
   >load qptool register -p placename -placecatalog
10. To unregister a place:
    >load qptool unregister -p placename
11. To register a place that has been moved from another server, renamed on the current server, or restored from archive:
    >load qptool register -p placename -install
12. To unregister a server with the Place Catalog:
    >load qptool unregister -server
13. To register a server with the Place Catalog:
    >load qptool register -server Automating Replica Stub Creation After the creation of new places 114, rooms 113, and PlaceTypes 102, a QPTool replicamaker command is used to create replica stubs for the new places, rooms, and PlaceTypes on other servers in a cluster 318. After creation of the replica stubs, cluster replication or standard replication replicates the new places, rooms, and PlaceTypes to populate them initially and then keep them synchronized.

The replicamaker command does the following:
1. Creates replica stubs for MAIN.NSF and CONTACTS1.NSF on the local server or another server when a place or PlaceType is created.
2. Makes a new copy of SEARCH.NSF on the local server or another server when a place is created.
3. Creates replica stubs on the local server or another server for any new rooms.

PlaceTypes replicate and the replicamaker command creates replica stubs for PlaceTypes 102 the same way it creates replica stubs for places 114. The syntax for the replicamaker command is:

load qptool replicamaker arguments

Table 12 describes the arguments used with the replicamaker command. XML input and output files are not used with this command.

TABLE 12

| LOAD QPTOOL REPLICAMAKER ARGUMENTS | | |
|---|---|---|
| -pt placetype(s) | Creates replica stubs for a specified PlaceType or stubs for a space-separated list of PlaceTypes. |
| -p place(s) | Creates replica stubs for a specific new place or stubs for a space-separated list of new places. |
| -a | Creates replica stubs for all new places, rooms, and PlaceTypes. |
| -t targetserver | The name of another server involved with the replication. If not specified, default is the local server. If -t is not used, then -s must be used. |
| -s sourceserver | The name of one server involved with the replication. If not specified, default is the local server. If -s is not used, -t must be used. |
| -? | Prints help on the command. |

Examples of using the replicamaker command are as follows.

1. For all new places, rooms, and PlaceTypes created on the local server, to create replica stubs on Server2Acme; and for all new places, rooms, and PlaceTypes on Server2/Acme, to create replicate stubs on the local server:
   Use either of the following commands:
   >load qptool replicamaker -t Server2/Acme -a
   >load qptool replicamaker -s Server2/Acme -a
2. For a new place P1 on the local server, to create replica stubs on the server Server2/Acme; and for the new place P1 on Server2/Acme, to create replica stubs on the local server.

Use either of the following commands:
>load qptool replicamaker -p P1 -t Server2/Acme
>load qptool replicamaker -p P1 -s Server2/Acme The replicamaker command, when run in verbose mode, logs all activity and errors to the server console and helps identify any problems as they arise.

Turning on verbose logging for replicamaker on a server is done by:
1. Shuting down the server.
2. Editing the NOTES.INI file in the program directory and adding the following:
   QuickPlaceStubMakerLogging=3
3. Starting the server.

Ensuring that replica stubs of new places 114, rooms 113 and PlaceTypes 102 are created quickly and that replication then populates the places, rooms, and PlaceTypes quickly, is done by:
1. Creating program documents in the Domino 280 directory that runs the QPTool replicamaker command with the -a argument between the servers in a cluster every 10 minutes. If there are more than two servers in the cluster, more than one program document is used to run the replicamaker command to ensure that replica stubs are created on all servers in the cluster.
2. Scheduling non-cluster replication between all servers in the cluster to occur at least every 20 minutes, to compensate for any lags in cluster replication.

Upgrading Places and PlaceTypes

The QPTool upgrade command is used to upgrade existing places 114 and PlaceTypes 102 from QuickPlace 2.0.6 or higher, to upgrade to achieve full QuickPlace Release 3.0 functionality. The syntax for the upgrade command is:
   load qptool upgrade arguments Table 13 describes the arguments used with the upgrade command.

TABLE 13

LOAD QPTOOL UPGRADE ARGUMENTS

| 1 | -pt PlaceType(s) | Upgrades a specified PlaceType or space- |
| 2 | | separated list of PlaceTypes on the |
| 3 | | server. If the place from which the |
| 4 | | PlaceType was created still exists, the |
| 5 | | place is upgraded before upgrading the |
| 6 | | PlaceType. |
| 7 | -p place(s) | Upgrades a specified place or space- |
| 8 | | separated list of places. |
| 9 | -f | Runs upgrade even if system has not detected it |
| 10 | | needs to be run or even if it has detected the |
| 11 | | database version does not support upgrade. |
| 12 | -a | Upgrades all places and PlaceTypes on the server. |
| 13 | -server | Runs the design task for all data on the server. |
| 14 | | If this is executed before server start up, then |
| 15 | | it also upgrades the administration place as well. |
| 16 | | This command is used right before upgrading all |
| 17 | | places and PlaceTypes with the "qptool upgrade |
| 18 | | -a" command or multiple specified place and |
| 19 | | PlaceTypes with "-p" or "-pt" arguments. Doing |
| 20 | | so gives optimal performance when upgrading a |
| 21 | | large number of places and PlaceTypes. |
| 22 | -o | XML output file that logs the results of the |
| 23 | | command. By default the command logs results to |
| 24 | | QPTOOL.UPGRADE.XML in the server program |
| 25 | | directory. |
| 26 | -i | XML input file that specifies the places and |
| 27 | | PlaceTypes to upgrade. |
| 28 | -? | Prints help on the command. |

Following are examples of use of the upgrade command.
1. To upgrade PlaceTypes 102 PT1, PT2, and PT3 and log results to the XML output file 72 QPTOOL.MYUPGRADE.XML:
   >load qptool upgrade -pt PT1 PT2 PT3 -o qptool.myupgrade.xml
2. To upgrade place 114 P1:
   >load qptool upgrade -p P1
3. To upgrade all places 114 and PlaceTypes 102 on the server 102:
   >load qptool upgrade -a
4. To run the design task on the server 102 before upgrading multiple places 114 and PlaceTypes 102:
   >load qptool upgrade -server

Refreshing Places and PlaceTypes

The QPTool refresh command is used to refresh places 114 and PlaceTypes 102 on QuickPlace server 101. The syntax for the refresh command is:
   load qptool refresh arguments PlaceTypes can also be refresh using the PlaceTypes view in the administration place. Table 14 gives the arguments for the refresh command.

TABLE 14

LOAD QPTOOL REFRESH ARGUMENTS

| 1 | -pt placetype(s) | Refreshes the elements of a specified |
| 2 | | PlaceType or space-separated list of |
| 3 | | PlaceTypes with design of the parent |
| 4 | | PlaceType(s). |
| 5 | -p place(s) | Refreshes the elements of a specified |
| 6 | | place or space-separated list of places |
| 7 | | with the elements of its parent |
| 8 | | PlaceType(s). |
| 9 | -a | Refreshes the elements of all places on the server |
| 10 | | created from PlaceTypes with the parent |
| 11 | | PlaceTypes. |
| 12 | -? | Prints help on the command. |
| 13 | -o | XML output file that logs the results of the |
| 14 | | command. By default the command logs results to |
| 15 | | QPTOOL.REFRESH.XML in the server program |
| 16 | | directory. |
| 17 | -i | XML input file that specifies places and/or |
| 18 | | PlaceTypes to be refreshed. |
| 19 | -d placetypes(s) | Refreshes the elements of all places |
| 20 | | (not PlaceTypes) created from the |
| 21 | | specified PlaceType or space-separated |
| 22 | | list of PlaceTypes. |

When the NOTES.INI file on a QuickPlace server 101 includes the setting ServerTasksAt4=qptool refresh -a all child places 114 (not PlaceTypes) are refreshed nightly at 4 AM.

Following are examples of use of the refresh command.
1. To refresh the elements of all places on the server created from PlaceTypes:
   >load qptool refresh -a
2. To refresh the elements of child places P1 and P2 with the design of their parent PlaceTypes:
   >load qptool refresh -p P1 P2
3. To refresh the elements of child PlaceTypes PT1 and PT2 with the design of their parent PlaceTypes:
   >load qptool refresh -pt PT1 PT2

Locking and Unlocking Places on the Server

The QPTool lock/unlock command is used to take places 114 in and out of service 100 without stopping the server

101. The lock command is used to put places temporarily out of service 100 during maintenance operations and then the unlock command is used when the maintenance operations are complete. When a place 114 is locked, an end user trying to access that place receives a message that is specified by an administrator which explains that the place is temporarily out of service.

Other qptool commands lock places 114 specified in the command automatically before running and then unlock the places when the operations are complete. However, it may be desired to lock a place 114 before running multiple qptool commands to prevent users from accessing the place until the commands have finished running. For example, a place 114 may be locked while using the changemember command to change several member 104 names within the place to prevent members from accessing the place until all the name changes are complete. When a place 114 is locked, the only QPTool command that can be run on it is unlock.

The syntax for the lock/unlock command is:

qptool lock[unlock] arguments

Table 15 describes the arguments for the lock and unlock commands.

TABLE 15

| QPTOOL LOCK[UNLOCK] ARGUMENTS | |
|---|---|
| 1 -o | XML output file that logs the results of the |
| 2 outputfile | command. By default the command logs results |
| 3 | to QPTOOL.LOCK.XML or QPTOOL.UNLOCK.XML in |
| 4 | the server program directory. To receive |
| 5 | even more information during the lock/unlock |
| 6 | process, QuickPlaceLockLogging=1 can be set |
| 7 | in the NOTES.INI file. |
| 8 -i | XML input file that specifies the places to |
| 9 inputfile | lock/unlock. |
| 10 -message | Specifies a message to display to users |
| 11 message | who visit a locked place. Quotes are |
| 12 | used if the message contains spaces. |
| 13 -p | Specifies a place or a space-separated list |
| 14 place(s) | of places to lock/unlock. |
| 15 -a | Locks/unlocks all places. |
| 16 -? | Prints help on the command. |

Several examples of use of the qptool lock/unlock command are as follows.

1. Command to unlock a place:

>load qptool unlock -p placename

2. Command to lock a place.

>load qptool lock -p placename -message "Place is undergoing membership changes. Please try back after 4 pm." (where placename is the name of the place being locked)

Archiving Places

The QPTool archive command is used to copy places 114 to a specified directory. This archive command is used when:

1. Backing up active places 114 by archiving them to a target directory without deleting them from their QuickPlace server 101.
2. Backing up inactive places 114 before removing them from the QuickPlace server 101.

The syntax for the Archive command is:

load qptool archive arguments

Table 16 describes the arguments.

TABLE 16

| LOAD QPTOOL ARCHIVE ARGUMENTS | |
|---|---|
| 1 -o outputfilename | XML output file that logs the results of |
| 2 | the command. By default the command |
| 3 | logs results to QPTOOL.ARCHIVE.XML in |
| 4 | the server program directory. |
| 5 -i inputfilename | XML input file that specifies the places |
| 6 | to archive. |
| 7 -p place(s) | Specifies a place or a space-separated |
| 8 | list of places to archive. |
| 9 -a | Archive all places. |
| 10 -dir path directory | Directory in which to archive |
| 11 | places. If an archive directory is |
| 12 | specified without an explicit path, |
| 13 | the specified archive directory is |
| 14 | put in the server program |
| 15 | directory. If the specified |
| 16 | directory does not already exist, |
| 17 | it is created. |
| 18 -? | Prints help on the command. |

Examples of using the archive command are as follows.

1. To archive a place to a directory below c:\ and log output to a non-default XML file location:

>load qptool archive -p placename -dir c:\placenameback -o c:\qptool.archive.xml 2. To archive places specified in an XML input file 70 to a directory below c:\:

>load qptool archive -i qptool.archive.xml -dir c:\threeplaces

3. To archive more than one place 114 to a target directory below c:\:

>load qptool archive -dir c:\threeplaces -p placeone placetwo placethree

4. To back up all places 114, 139 on the server 101:

>load qptool archive -dir x:\qpbackup -a

If a place 114 is archived and then deleted from the QuickPlace server 101, the register command may be used to restore it.

For example, if the archive and remove commands were executed to archive a place and then to remove it from the data directory, as follows:

1. >load qptool archive -p placename -dir d:\archivedir
2. >load qptool remove -p placename -now the archived place could later be restored so that users can access it again from a browser, by doing the following:

1. Copy d:\archivedir\placename back to the program\data\QuickPlace directory.
2. Specify this QPTool command:

>load qptool register -p placename -install

Removing Places and PlaceTypes from the Server

The QPTool remove command is used to remove places 114 or PlaceTypes 102 from the QuickPlace server 101, such as a place or PlaceType that is no longer used or that hasn't been used for a long time. The syntax for the remove command is: load qptool remove arguments Table 17 describes the arguments for the command.

TABLE 17

LOAD QPTOOL REMOVE ARGUMENTS

| | | |
|---|---|---|
| 1 | -o outputfilename | XML output file that logs the results of |
| 2 | | the command. By default the command logs |
| 3 | | results to QPTOOL.REMOVE.XML in the |
| 4 | | server program directory. |
| 5 | -i inputfilename | XML input file that specifies places or |
| 6 | | PlaceTypes to mark for removal or to |
| 7 | | delete. |
| 8 | -pt PlaceTypes | Specifies a PlaceType or a space- |
| 9 | | separated list of PlaceTypes to mark for |
| 10 | | removal or to delete. |
| 11 | -p place(s) | Specifies a place or a space-separated list |
| 12 | | of places to mark for removal or to delete. |
| 13 | -a | Marks for removal or deletes all places on |
| 14 | | the server. This argument does not run on |
| 15 | | PlaceTypes. |
| 16 | -cleanup | Deletes places or PlaceTypes that were |
| 17 | | previously marked for removal through the |
| 18 | | remove command or that were deleted through |
| 19 | | the QuickPlace user interface. The |
| 20 | | ServerTasksAt2 NOTES.INI setting includes |
| 21 | | qptool remove -cleanup, so that the command |
| 22 | | runs by default at 2 AM. The - cleanup |
| 23 | | argument only works on databases that are not |
| 24 | | in the database cache. The dbcache flush |
| 25 | | command is used to flush databases from the |
| 26 | | cache before using -cleanup. The -cleanup |
| 27 | | argument replaces the QuickPlace 2.0 |
| 28 | | quickplacenightly command used to delete |
| 29 | | places and PlaceTypes. |
| 30 | -now | Deletes places or PlaceTypes immediately. If |
| 31 | | this argument is not used, places or |
| 32 | | PlaceTypes are only marked for removal. A |
| 33 | | place or PlaceType that is marked for removal |
| 34 | | is inaccessible from a browser but still |
| 35 | | exists in the file system. |
| 36 | -? | Prints help on the command. |

When using search places 114 on server 101, the -now argument is not used to remove places. Instead the remove command without the -now argument is used and the places 114 marked for removal. After marking the places for removal, Catalog and Domidx tasks are run on the domain catalog server 280. After the Domidx task has completed, the remove command is used with the -cleanup argument to remove the places. This removal procedure is followed to ensure that information in documents from the deleted places is also removed from the search index.

Following are several examples of using the remove command.

1. The command to mark the place P1 for removal
   >load qptool remove -p P1
2. The command to mark all places on the server for removal:
   >load qptool remove -a
3. The command to mark PlaceType PT1 for removal:
   >load qptool remove -pt PT1
4. The command to mark places P1, P2, and P3 for removal:
   >load qptool remove -p P1 P2 P3
5. The command to mark places for removal that are specified in the XML input file QPTOOL.REMOVEINPUT.XML:
   >load qptool remove -i qptool.removeinput.xml
6. The command to mark the place P1 for removal and log output to the non-default XML file QPTOOL.REMOVEOUTPUT.XML:
   >load qptool remove -p P1 -o qptool.removeoutput.xml
7. The command to remove the place P1 immediately:
   >load qptool remove -p P1 -now
8. The command to remove all PlaceTypes on the server immediately. The -a argument is not used to remove all PlaceTypes.
   >load qptool remove -pt PT1 PT2 PT3 PT4 PT5 -now Updating Statistics in the Place Catalog The QPTool placecatalog command is used to update statistics in place catalog 120, and is used for two purposes: (1) to update PlaceLastModified and the PlaceSize statistics, and (2) to synchronize statistics in place 320 documents between a master server 312 and the other servers 314, 316 in a cluster.

Generally when a statistic for a place changes the place document in database 129 in place catalog 120 is automatically updated to reflect the change. This automatic update occurs immediately, or in the case of the PlaceLastAccessed statistic, within a minute of the change.

Changes to the PlaceLastModified or the PlaceSize statistic are not updated in place catalog 120 automatically however. To update these statistics in place catalog 120 the placecatalog command is used with the -push argument on the place server 101. By default the NOTES.INI file on a QuickPlace server 101 includes the following setting so that this command runs nightly at 3 AM to update place catalog 120 with these two statistics for all places.

ServerTasksAt3=qptool placecatalog -push -a

This command is run manually, for example, before using the report command so that up-to-date statistics are reported.

Within a cluster 318, a place's place document for the master server 312 might contain different statistics than place documents for the other servers 314, 316. The placecatalog command is used with the -update argument on place catalog server 280 to synchronize a place's statistics across all place documents. The placecatalog -update is used, for example, before using the report command in a cluster environment to ensure that the report contains up-to-date statistics.

The syntax for the placecatalog command is:

qptool placecatalog arguments

Table 18 describes the arguments.

TABLE 18

QPTOOL PLACECATALOG ARGUMENTS

| | | |
|---|---|---|
| 1 | -o outputfile | Logs results to a specified XML output file. |
| 2 | | By default logs results to |
| 3 | | QPTOOL.PLACECATALOG.XML. |
| 4 | -i inputfile | Updates statistics on places specified in an |
| 5 | | XML input file. |
| 6 | -p place(s) | Updates statistics on a specified place or |
| 7 | | space-separated list of places. |
| 8 | -push | Updates statistics for all places on the server. - |
| 9 | | a Pushes PlaceLastModified and PlaceSize |
| 10 | | statistics from this server to the Place Catalog. |
| 11 | | This command is only run on a place server. |
| 12 | -update | Synchronizes statistics between the Place document |
| 13 | | for the master server and the Place documents for |
| 14 | | other servers. This command is only run on a Place |
| 15 | | Catalog server. |
| 16 | -? | Prints help on the command. |

Generating Reports about Places and Servers

The QPTool report command is used to pull information from place catalog 120 to generate reports about places 114 in QuickPlace service 100 and about servers 119 that use the service. The report command is used to retrieve the following information from place catalog 120 database 129 about places 114:
Name
Title
Server name
Size
Date last accessed
Date last modified
Locked state Although place catalog 120 lists the Readers, Authors, and Managers (Table 3 line 53) of places, the report command is not used to generate this information in a report. The report command is used to retrieve the following information from place catalog 120 about servers that use the QuickPlace service 100:
Name
Access Protocol
Access TCP Port
Access URL Prefix If more than one server 101 shares place catalog 120, a report specifies data for all servers 119 in service 100.

Before using the report command, the following is done:
1. The Place Catalog is installed and full-text indexed.
2. The QPTool placecatalog command is used to update the statistics in the PlaceCatalog.
3. The Place Catalog full-text index is brought up-to-date.

The syntax for the report command is:
load qptool report arguments
Table 19 describes the arguments for this command.

TABLE 19

LOAD QPTOOL REPORT ARGUMENTS

| | | |
|---|---|---|
| -o outputfilename | | XML output file that logs the results of the command. By default the command logs results to QPTOOL.REPORT.XML in the server program directory. |
| -s | | Generates a report using information in the PlaceServers view for all servers listed in the Place Catalog. |
| -p place(s) | | Generates a report for a specified place or a space-separated list of places. |
| -q query | | Generates a report for places that match the criteria specified in a query. In a query, a search is refined by using operators in conjunction with any of the following fields: PlaceName PlaceTitle PlaceServerName PlaceSize PlaceLastAccessed PlaceLastModified For example, a report can be generated on all places last accessed before a specified date. Begin and end a query with quotation marks. |
| -a | | Generates a report for all places. |
| -? | | Prints help on the command. |

Following are several examples of using the report command.

1. To report on all places last accessed before May 30, 2002:
   >load qptool report -q [PlaceLastAccessed]<May 30, 2002
2. To report on all places whose size is greater than 1000 kilobytes:
   >load qptool report -q [PlaceSize]>1000.
3. To report on all places in the Place Catalog
   >load qptool report -a
4. To report on a specific place:
   >load qptool report -p placename 5. To report on all places and log results to a non-default XML output file QPTOOL.MYOUT.XML:
   >load qptool report -a -o qptool.myout.xml
6. Report on all servers in the Place Catalog using information from PlaceServers view:
   >load qptool report -s
7. Report on all places last modified after May 30, 2002:
   >load qptool report -q [PlaceLastModified]>May 30, 2002

Repairing broken places 139 on server 101 is done by running the QPTool repair command. The repair command fixes very specific problems that are described below.

The repair command is intended to get QuickPlace up and running as soon as possible, but it does not necessarily fix the source of the problem; rather, it re-normalizes data that is no longer synchronized. That is, until the source of the problem is addressed, or until QuickPlace source code is fixed, the repair command will work as a temporary solution.

The syntax for the repair command is:
qptool repair arguments

TABLE 20

QPTOOL REPAIR ARGUMENTS

| | |
|---|---|
| -o outputfile | Logs results to a specified XML output file. By default logs results to QPTOOL.REPAIR.XML. |
| -i inputfile | Repairs places specified in an XML input file. |
| -p place(s) | Repairs the specified place or space-separated list of places. |
| -a | Repairs all places on the server. |
| -? | Prints help on the command. |

Cleaning Up Dead Mail

The QPTool deadmail command is used to clean up QuickPlace dead mail.

The syntax for the deadmail command is:
qptool deadmail arguments

Table 21 describes the arguments.

TABLE 21

QPTOOL DEADMAIL ARGUMENTS

| | |
|---|---|
| -o outputfile | Logs results to a specified XML output file. By default logs results to QPTOOL.DEADMAIL.XML. |
| -cleanup | Cleans up QuickPlace dead mail. |
| -? | Prints help on the command. |

By default the NOTES.INI file on a QuickPlace server includes the setting ServerTasksAt3=qptool deadmail -cleanup so that the QuickPlace server cleans up dead mail nightly at 3 AM.

Executing an XML API File

The QPTool execute command is used to execute an XML API file 70. The syntax for the execute command is:
qptool execute arguments Table 22 describes the arguments.

TABLE 22

QPTOOL EXECUTE ARGUMENTS

| | | |
|---|---|---|
| 1 | -o outputfile | Logs results to a specified XML output file 72. By default logs results to QPTOOL.EXECUTE.XML in the Domino program directory. |
| 2 | | |
| 3 | | |
| 4 | | |
| 5 | -i inputfile | Specifies the XML API file 70 to execute. If a path is not specified, the default location is the Domino program directory. |
| 6 | | |
| 7 | | |
| 8 | -? | Prints help on the command. |

Advantages Over the Prior Art

The administrator of a QuickPlace server, for example, is provided with an improved system and method for:
  Enabling and disabling QuickPlace features for all places on the QuickPlace server.
  Managing all places on the QuickPlace server.
  Managing PlaceTypes in order to use an existing place as a model, or template, for a new place.
  Setting up e-mail communications.
  Managing the Search Places feature that uses Domain Search to search across places.
  Setting up client authentication and specify access control features.
  Establishing connections to an LDAP user directory on the company network or on the Internet, to simplify the registration of new members in each place on the QuickPlace server.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. Method for command line administration of project spaces using extensible markup language objects, comprising:
  storing project data in a data store, said data store including a project catalog database and a plurality of objects in project spaces;
  receiving a first user command including an output command and arguments with respect to an object in said data store;
  executing said first user command against said object in said data store to generate a first extensible markup language file;
  receiving at least one subsequent user commands, each said subsequent user command including an input command; and
  executing a first subsequent second user command against said first extensible markup language file and said data store to manage said objects in said data store and generate a resultant output extensible markup language file when needed for reentrant processing.

2. The method of claim 1, further comprising:
  reentrant processing further subsequent user commands with respect to said resultant output extensible markup language file and subsequent resultant extensible markup language output files resulting from reentrant execution of said further subsequent user commands.

3. The method of claim 1, further comprising executing said executing steps at each user selected server within a service.

4. The method of claim 2, further comprising executing said executing and reentrant processing steps at each user selected server with a service.

5. The method of claim 1, further comprising selectively running said command line tool from a server console, program directory, batch file, or other program.

6. The method of claim 1, further comprising:
  said object being selected from within an object model including session, service, server, placetype, place, member, and room;
  said session object associating an identity with an administration element action;
  said service object comprising a plurality server objects and/or clusters that are in a same domain, share a same user directory and authentication system, are on a same user network, and are administered by a same administration team;
  said server object being a physical or virtual server entity or element that is addressable and contains one or more places and place types;
  said place object being an entry point into a project and all its data elements and methods;
  said member object being a member of a place, selectively including person, local person, group and local group having an associated identity and profile;
  said room object being a room within a place for controlling access to a subset of the data in a project; and
  said placetype object being a template for creating new place objects and for controlling the design logic and content of a child place object by refreshing it with changes made to its placetype.

7. The method of claim 3, further comprising upon executing a command on a first server in a cluster, first executing cluster replication and then executing said command on other servers in said cluster.

8. The method of claim 6, said user commands selectively including change user and group names in places, changing a hierarchy of names in places, resetting user passwords, removing members from places, sending newsletters to subscribers, sending mail to managers and members of places, registering and unregistering places, automating replica stub creation, upgrading places and placetypes, refreshing places and placetypes, locking and unlocking places, archiving places, removing places or placetypes, updating statistics in a place catalog, generating reports about places and servers, repairing places, cleaning up dead mail and executing an XML API file.

9. A system for command line administration of project spaces using extensible markup language objects, comprising:
    means for storing project data in a data store, said data store including a project catalog database and a plurality of objects in project spaces;
    means for receiving a first user command including an output command and arguments with respect to an object in said data store;
    means for executing said first user command against said object in said data store to generate a first extensible markup language file;
    means for receiving at least one subsequent user commands, each said subsequent user command including an input command; and
    means for executing a first subsequent second user command against said first extensible markup language file and said data store to manage said objects in said data store and generate a resultant output extensible markup language file when needed for reentrant processing.

10. A system for command line administration of project spaces using extensible markup language objects, comprising:
    a data store for storing project data, said data store including a project catalog database and a plurality of objects in project spaces;
    a command line element for receiving a first user command including an output command and arguments with respect to an object in said data store;
    a first command processor for executing said first user command against said object in said data store to generate a first extensible markup language file;
    a second command processor for receiving at least one subsequent user commands, each said subsequent user command including an input command, and executing a first subsequent second user command against said first extensible markup language file and said data store to manage said objects in said data store and generate a resultant output extensible markup language file when needed for reentrant processing.

11. The system of claim 10, further comprising:
    a reentrant processing path for executing further subsequent user commands with respect to said resultant output extensible markup language file and subsequent resultant extensible markup language output files resulting from reentrant execution of said further subsequent user commands.

12. The system of claim 10, further comprising
    a plurality of servers within a service; and
    said first command processor further for executing said executing steps at each user selected server within said service.

13. The system of claim 11, further comprising
    a plurality of servers within a service; and
    said first command processor further for executing said executing steps at each user selected server within said service; and
    said second command processor further for executing said reentrant processing steps at each said user selected server with said service.

14. A program storage device readable by a machine, tangibly embodying a program of instructions executable by a machine to perform method steps for command line administration of project spaces using extensible markup language objects, said method comprising:
    storing project data in a data store, said data store including a project catalog database and a plurality of objects in project spaces;
    receiving a first user command including an output command and arguments with respect to an object in said data store;
    executing said first user command against said object in said data store to generate a first extensible markup language file;
    receiving at least one subsequent user commands, each said subsequent user command including an input command; and
    executing a first subsequent second user command against said first extensible markup language file and said data store to manage said objects in said data store and generate a resultant output extensible markup language file when needed for reentrant processing.

15. The program storage device of claim 14, said method further comprising:
    reentrant processing further subsequent user commands with respect to said resultant output extensible markup language file and subsequent resultant extensible markup language output files resulting from reentrant execution of said further subsequent user commands.

16. The program storage device of claim 14, said method further comprising executing said executing steps at each user selected server within a service.

17. The program storage device of claim 14, said method further comprising executing said executing and reentrant processing steps at each user selected server within a service.

18. The program storage device of claim 14, said method further comprising:
    said object being selected from within an object model including session, service, server, placetype, place, member, and room;
    said session object associating an identity with an administration element action;
    said service object comprising a plurality server objects and/or clusters that are in a same domain, share a same user directory and authentication system, are on a same user network, and are administered by a same administration team;
    said server object being a physical or virtual server entity or element that is addressable and contains one or more places and place types;
    said place object being an entry point into a project and all its data elements and methods;
    said member object being a member of a place, selectively including person, local person, group and local group having an associated identity and profile;
    said room object being a room within a place for controlling access to a subset of the data in a project; and
    said placetype object being a template for creating new place objects and for controlling the design logic and content of a child place object by refreshing it with changes made to its placetype.

19. The program storage device of claim 16, said method further comprising upon executing a command on a first server in a cluster, first executing cluster replication and then executing said command on other servers in said cluster.

20. The program storage device of claim 18, said user commands selectively including change user and group names in places, changing a hierarchy of names in places, resetting user passwords, removing members from places, sending newsletters to subscribers, sending mail to managers and members of places, registering and unregistering places, automating replica stub creation, upgrading places and placetypes, refreshing places and placetypes, locking and unlocking places, archiving places, removing places or placetypes, updating statistics in a place catalog, generating reports about places and servers, repairing places, cleaning up dead mail and executing XML an API file.

* * * * *